(12) United States Patent
Oda

(10) Patent No.: US 7,302,855 B2
(45) Date of Patent: Dec. 4, 2007

(54) PRESSURE DETECTION DEVICE

(75) Inventor: Teruo Oda, Gamagori (JP)

(73) Assignee: DENSO CORPORATION, Kariya (JP)

( * ) Notice: Subject to any disclaimer, the term of this patent is extended or adjusted under 35 U.S.C. 154(b) by 9 days.

(21) Appl. No.: 11/252,015

(22) Filed: Oct. 18, 2005

(65) Prior Publication Data

US 2006/0090566 A1    May 4, 2006

(30) Foreign Application Priority Data

Oct. 28, 2004  (JP)  ............................. 2004-313971
Mar. 9, 2005   (JP)  ............................. 2005-065383

(51) Int. Cl.
    *G01L 7/00*    (2006.01)
(52) U.S. Cl. ...................................... 73/756
(58) Field of Classification Search .................. 73/700, 73/715, 756
    See application file for complete search history.

(56) References Cited

U.S. PATENT DOCUMENTS 6,575,038 B1 *  6/2003  Takakuwa et al. ............ 73/706
6,807,864 B2 * 10/2004  Takakuwa et al. ............ 73/706
6,813,953 B2 * 11/2004  Baba et al. .................... 71/715
7,114,396 B2 * 10/2006  Oda et al. ...................... 73/715

FOREIGN PATENT DOCUMENTS

JP          A-5-34231       2/1993

* cited by examiner

*Primary Examiner*—Andre J. Allen
(74) *Attorney, Agent, or Firm*—Posz Law Group, PLC

(57) ABSTRACT

A pressure detection device includes a sensing part that outputs an electrical signal responsive to an applied pressure, a pressure receiving diaphragm that receives a pressure from a subject device, a cylindrical stem having a first end connected to the sensing part and a second end connected to the pressure receiving diaphragm, and a pressure transmission member located within the cylindrical member to transmit the pressure received by the pressure receiving diaphragm to the sensing part. In the pressure detection device, a side wall portion of the cylindrical stem has a spring portion which is provided to generate an elastic force in an axial direction of the cylindrical member. Accordingly, fluctuations in a spring characteristic acting on a pressure transmission mechanism of the pressure detection device can be effectively restricted by the spring portion.

13 Claims, 11 Drawing Sheets

PRESSURE DETECTION DEVICE

CROSS REFERENCE TO RELATED APPLICATION

This application is based on Japanese Patent Applications No. 2004-313971 filed on Oct. 28, 2004, and No. 2005-65383 filed on Mar. 9, 2005, the contents of which are incorporated herein by reference in its entirety.

FIELD OF THE INVENTION

The present invention relates to a pressure detection device in which a pressure transmission part is inserted between a pressure receiving diaphragm and a sensing part to bring the pressure transmission part into contact with the pressure receiving diaphragm and the pressure sensing part in a state where a pre-load is applied to them to construct a pressure transmission mechanism. In the pressure detection device, the pressure received by the pressure receiving diaphragm is transmitted to the sensing part via the pressure transmission part to thereby detect the pressure.

BACKGROUND OF THE INVENTION

As general pressure detection devices of this kind, there have been conventionally proposed devices each of which is constructed of a sensing part that outputs an electric signal responsive to an applied pressure, a pressure receiving diaphragm that receives the pressure, and a pressure transmission part that is interposed between the sensing part and the pressure receiving diaphragm and transmits the pressure received by the pressure receiving diaphragm to the sensing part (for example, JP-A-5-34231).

In the pressure detection device of this kind, three parts of the sensing part, the pressure receiving diaphragm, and the pressure transmission part are put into contact with each other in a state where the pressure receiving diaphragm and the sensing part sandwich the pressure transmission part to previously apply load, that is, to apply a pre-load to the pressure transmission part to thereby construct a pressure transmission mechanism.

In this pressure detection device, the pressure received by the pressure receiving diaphragm is transmitted to the sensing part via the pressure transmission part. Then, the sensing part outputs an electric signal responsive to the applied and transmitted pressure. Accordingly, this pressure detection device can detect pressure.

The inventor of the present application has made and studied a prototype of the pressure detection device of this kind and has found the following problems arising from the device.

The pressure detection device of this kind, as shown in FIG. 12, is used as a combustion pressure sensor that is provided in an engine block 200 as an attachment portion of a vehicle and detects pressure in a combustion chamber 202 (cylinder pressure).

A housing 210 of a pressure detection device 210 is provided with a detection element 230 as a sensing part that outputs an electric signal responsive to an applied pressure.

This detection element 230 is constructed of a semiconductor chip, for example, and has a strain gauge function such that the detection element 230 itself is strained to output a signal responsive to a detection pressure on the basis of its strain.

In the example shown in FIG. 12, this detection element 230 is supported by a hollow cylindrical metal stem 220, whose one end is an opening portion 221 and whose other end is closed by a thin diaphragm 222, and is fixed by fused glass or the like to the outer surface of the diaphragm 222 of the metal stem 220 as this supporting part.

The metal stem 220 is inserted into the housing 210 such that the diaphragm 222 is faced toward the inside of the housing 210, and the metal stem 220 and the housing 210 are joined and fixed to each other by welding, bonding, or the like.

As shown in FIG. 12, one end portion of a metal case 216 as a cylindrical part formed of metal in a cylindrical shape is joined and fixed to the opening portion 221 of the metal stem 220 at the tip of the housing 210. In other words, the detection element 230 as a sensing part is coupled to the one end portion of the metal case 216 via the metal stem 220.

A pressure receiving diaphragm 215 that receives pressure and is formed of metal in the shape of a circular plate is provided on the other end portion of the metal case 216. Here, the metal case 216 is joined and fixed to the pressure receiving diaphragm 215 by welding such as laser welding.

Accordingly, the pressure receiving diaphragm 215 and the metal stem 220 are integrated into one unit via the metal case 216. Then, this pressure receiving diaphragm 215 faces the above-described combustion chamber 202 and receives combustion pressure (cylinder pressure), thereby being strained.

As shown by arrows in FIG. 12, the one end portion of the pressure transmission part 217 is put into contact with the detection element 230 via the diaphragm 222 of the metal stem 220 in such a manner that a pre-load is applied to the detection element 230, and the other end portion of the pressure transmission part 217 is put into contact with the pressure receiving diaphragm 215 in such a manner that a pre-load is applied to the pressure receiving diaphragm 215.

In the pressure transmission mechanism constructed of the pressure receiving diaphragm 215, the pressure transmission part 217, and the detection element 230, the pressure in the combustion chamber 202, that is, the subject pressure is applied to the diaphragm 222 of the metal stem 220 and the detection element 230 from the pressure receiving diaphragm 215 via the pressure transmission part 17.

To prevent a pressure leakage from the combustion chamber 202, a tapered surface 223 is formed on the outer peripheral surface of the metal stem 220 provided with the detection element 230 in the pressure detection device, and this tapered surface 223 is pressed onto and put into contact with a tapered surface formed on the threaded hole portion 201 side to thereby seal the engine block 200.

In the pressure detection device shown in FIG. 12, the pressure diaphragm 215 has a spring function. By spring characteristic exerted by the pressure receiving diaphragm 215, the pre-load between the pressure receiving diaphragm 215, the pressure transmission part 217, and the detection element 230, that is, the pre-load between the parts constructing the pressure transmission mechanism is held, and fluctuations in the pre-load caused by the difference in thermal expansion between these parts are absorbed.

However, when the pressure receiving diaphragm 215 has the function of receiving pressure, the function of holding a pre-load, the function of absorbing fluctuations in the pre-load caused by the difference in thermal expansion, and the function of transmitting the pressure, and further is exposed directly to a measurement environment, there are presented the following problems.

First, in the case where the pressure detection device is used for a combustion pressure sensor or the like, when flame develops in the combustion chamber 202 at the time of combustion, the pressure receiving diaphragm 215 exposed to the measurement environment is directly irradiated with the flame.

Therefore, the pressure receiving diaphragm 215 is heated and hence softened by the flame when it is irradiated with the flame. In this case, linearity in the spring characteristic of the pressure receiving diaphragm 215 is deteriorated thereby losing the spring characteristic.

In the pressure receiving diaphragm 215, a pre-load is applied to the center portion of the pressure receiving diaphragm 215 by the pressure transmission part 217. Accordingly, when an excessive load is applied to the pressure receiving diaphragm 215, it causes damage to linearity in the spring characteristic of the pressure receiving diaphragm 215.

Moreover, there is a possibility that a temperature change caused by thermal shock or the like will cause damage to linearity in the spring characteristic of the pressure receiving diaphragm 215 at the time of low temperatures or high temperatures.

The pressure receiving diaphragm 215 is exposed to the combustion chamber 202 that is the measurement environment and hence deposits such as soot produced in the combustion chamber 202 adhere to the surface of the pressure receiving diaphragm 215.

Then, the adhesion of the deposits to the pressure receiving diaphragm 215 varies the spring characteristic of the pressure receiving diaphragm 215 from the initial state or causes damage to the spring characteristic.

Various problems such as a problem that linearity in the spring characteristics of the pressure receiving diaphragm 215 is damaged are raised by heating, the adhesion of the deposits, and the excessive application of load. In short, the spring characteristic acting on the pressure transmission mechanism constructed of the pressure receiving diaphragm 215, the pressure transmission part 217, and the sensing part 30 fluctuates and has a bad effect on the sensor characteristics.

When the pressure detection device is mounted on the engine block 200, the tapered surface 223 as a sealing surface formed on the metal stem 220 as a supporting part is pressed onto the inner surface of the threaded hole portion 201 of the engine block 200 to seal the engine block 200.

In this case, there is a possibility that the metal stem 220 as a part having the sealing surface 223 is pressed onto the threaded hole portion 201 and hence may be deformed.

When the metal stem 220 is deformed, its deformation is transmitted as mechanical noises to the detection element 230 mounted directly on the metal stem 220, thereby deteriorating the sensing characteristics of the detection element 230.

SUMMARY OF THE INVENTION

In view of the above-described problems, it is an object of the present invention to provide a pressure detection device which improves sensing characteristics.

It is another object of the present invention to provide a pressure detection device, which effectively restricts a variation in spring characteristics applied to a pressure transmission mechanism.

It is further another object of the present invention to provide a pressure detection device, which can reduce affect to sensor characteristics due to mechanical noise caused when the pressure detection device is mounted to an attachment portion of a subject device.

It is further another object of the present invention to provide a pressure detection device in which a pressure transmission performance from a pressure receiving diaphragm to a pressure sensing section (sensing part) via a pressure transmission member can be improved.

According to a first example of present invention, a pressure detection device includes a sensing part that outputs an electrical signal responsive to an applied pressure, a pressure receiving diaphragm that receives a pressure from a subject device, a cylindrical member having a first end connected to the sensing part and a second end connected to the pressure receiving diaphragm, and a pressure transmission member located within the cylindrical member to transmit the pressure received by the pressure receiving diaphragm to the sensing part. In the pressure detection device, the cylindrical member has a side wall portion formed approximately cylindrically, and the side wall portion has a spring portion which is provided to generate an elastic force in an axial direction of the cylindrical member. Accordingly, the spring portion of the cylindrical member can absorb a pre-load variation, thereby it is possible for the pressure receiving diaphragm to be formed from a rigid plate without spring characteristics. Thus, even if heat is applied to the pressure receiving diaphragm and deposits adhere on the pressure receiving diaphragm, the pressure receiving diaphragm can be prevented from being deformed or changed in rigidity. As a result, the pressure detection device effectively restricts a variation in spring characteristics applied to a pressure transmission mechanism, thereby improving sensing characteristics.

An outer peripheral surface of the cylindrical member can be provided with a sealing surface which contacts an attachment member of the subject device. In this case, because the sensing part is provided in a portion different from the seal surface, an affect to sensor characteristics due to mechanical noise can be effectively restricted. Here, the mechanical noise is caused when the pressure detection device is mounted to the attachment portion of the subject device.

For example, a support member connected to the cylindrical member at the first end can be provided. In this case, the sensing part can be attached to the support member. Here, the support member and the cylindrical member can be connected with each other by a screw connection.

The support member can have a straining portion connected to the first end of the pressure transmission member. In this case, the sensing part can be attached to the straining portion of the support member. Furthermore, the straining portion can have a protruding portion fixed to the first end of the pressure transmission member, and the pressure receiving diaphragm can have a diaphragm portion deformed in accordance with the pressure and a protruding portion fixed to the second end of the pressure transmission member. In this case, a pressure transmission performance from the pressure receiving diaphragm to the sensing part via the pressure transmission member can be effectively improved.

According to a second example of the present invention, a pressure detection device includes a first member including a sensing part that outputs an electrical signal responsive to an applied pressure, a second member including a pressure receiving diaphragm that receives a pressure from a subject device, and a pressure transmission member, which transmits the pressure received by the pressure receiving diaphragm to the sensing part. Here, the pressure transmission member is located between the sensing part and the pressure receiving diaphragm in such a manner that a load is applied from the pressure receiving diaphragm to the sensing part through the pressure transmission member. In the pressure detection device, a spring member is located between the first member and the second member to apply an elastic force to both the sensing part and the pressure receiving diaphragm in a direction where the sensing part and the pressure receiving diaphragm are separated from each other. As a result, the pressure detection device effectively restricts a variation in spring characteristics applied to a pressure transmission mechanism, thereby improving sensing characteristics.

Even in this case, the first member can be further provided with a support member to which the sensing part is attached, and an attachment member connected to the support member and having a sealing surface at an outer peripheral surface. In this case, the sealing surface contacts an attachment portion of the subject device. Further, the support member and the attachment member can be connected to each other by a screw connection.

In the above-described first and second examples of the present invention, the pressure receiving diaphragm and the pressure transmission member can be constructed of a single member or can be constructed with two or more separated members. Furthermore, the spring member can be located between the pressure receiving diaphragm and the pressure transmission member, or between the sensing part and the pressure transmission member.

According to a third example of the present invention, a pressure detection device includes: a stem having a closed end portion used as a pressure sensing section and an open end portion communicating with a hollow portion in the stem; a pressure receiving diaphragm that receives a pressure from a subject device, and is jointed to the stem to close the open end portion of the stem; and a pressure transmission member which is located in the hollow portion to transmit the pressure received by the pressure receiving diaphragm to the pressure sensing section. In the pressure detection device, the pressure sensing section of the stem is fixed to a first end portion of the pressure transmission member, and the pressure receiving diaphragm is fixed to a second end portion of the pressure transmission member. Accordingly, a pressure transmission performance from the pressure receiving diaphragm to the pressure sensing section via the pressure transmission member can be improved.

For example, the pressure sensing section of the stem has a first engagement portion engaged with the first end portion of the pressure transmission member, and the pressure receiving diaphragm has a second engagement portion engaged with the second end portion of the pressure transmission member.

Furthermore, the pressure sensing section of the stem and the first end portion of the pressure transmission member can be constructed of a single member, or the pressure receiving diaphragm and the second end portion of the pressure transmission member can be constructed of a single member.

In the third example of the present invention, the pressure receiving diaphragm can be provided with a diaphragm portion deformed in accordance with the pressure, and a fixing portion extending from the diaphragm portion to the second end portion of the pressure transmission member. In this case, the fixing portion of the pressure receiving diaphragm is fixed to the second end portion of the pressure transmission member, and the fixing portion can be an enlarged part enlarged from a side of the second end portion of the pressure transmission member to the diaphragm portion.

In the above-described examples of the present invention, a fuel combustion chamber of an engine can be used as the subject device, for example.

BRIEF DESCRIPTION OF THE DRAWINGS

The above and other objects, features and advantages of the present invention will become more apparent from the following detailed description of preferred embodiments made with reference to the accompanying drawings, in which.

DETAILED DESCRIPTION OF PREFERRED EMBODIMENTS

First Embodiment

In this embodiment, a pressure detection device 100 is typically used as a combustion pressure sensor.

Figure 1:
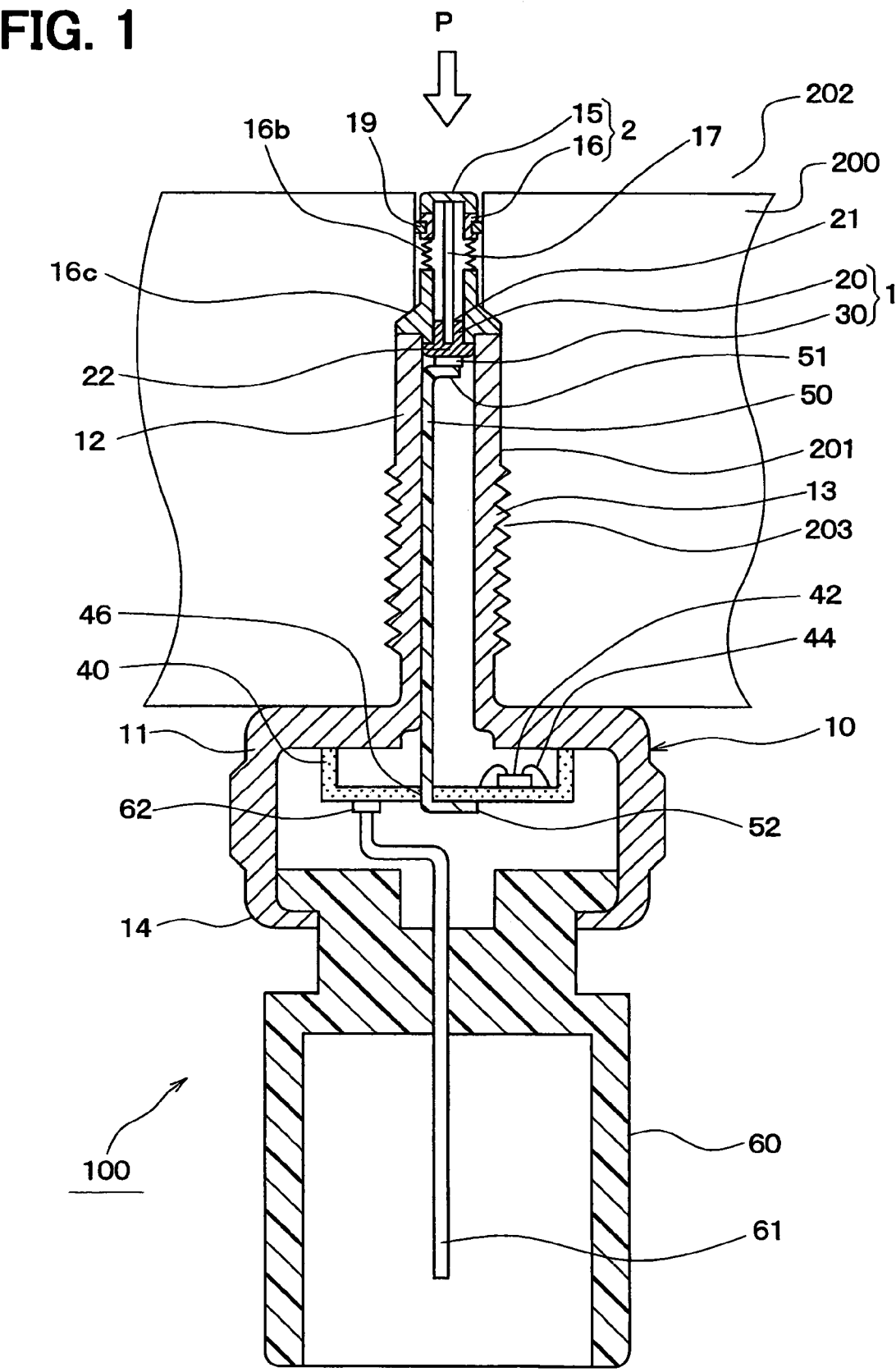
FIG. 1 is a schematic sectional view showing a pressure detection device according to a first embodiment of the present invention.

As shown in FIG. 1, in the pressure detection device 100 as a combustion pressure sensor, a pipe portion 12 of a housing 10 is inserted into a threaded hole portion 201 formed in an engine block 200 of an automobile and is jointed thereto by screwing, and senses pressure (cylinder pressure) in a combustion chamber 202 as a detection pressure.

The housing 10 of the pressure detection device 100 of the present embodiment is constructed of a cylindrical main portion 11 and the slender cylindrical pipe portion 12 which is more slender than the main portion 11.

These main portion 11 and pipe portion 12 are made of metal, for example, stainless steel by cutting or cold forging.

In the present embodiment, the pipe portion 12 is formed in the shape of a cylindrical pipe, but may be formed in the shape of a square pipe.

In the housing 10, the main portion 11 and the pipe portion 12 may be integrally formed. Alternatively, these portions 11, 12 can be formed separately and then can be joined to each other by welding, bonding, pressing-in, screwing, or caulking, thereby being integrated into one unit.

In the pressure detection device 100 of the present embodiment, the housing 10 has the slender pipe portion 12 protruding from its one end. Moreover, a threaded portion 13 capable of being joined by screwing to the engine block 200 is formed on the outer peripheral surface of the pipe portion 12 in the housing 10.

The pipe portion 12 of the housing 10 is inserted into the threaded hole portion 201 formed in the engine block (attachment member) 200, thereby the threaded portion 13 formed on the housing 10 can be screwed in a threaded portion 203 formed on the inner peripheral surface of the threaded hole portion 201.

The pressure detection device 100 is screwed in and mounted to the engine block 200 by this screwing-in construction. At this time, the pressure detection device 100 is mounted in such a way that a pressure receiving diaphragm 15 is exposed to the combustion chamber 202 that is a measurement environment.

Figure 2:
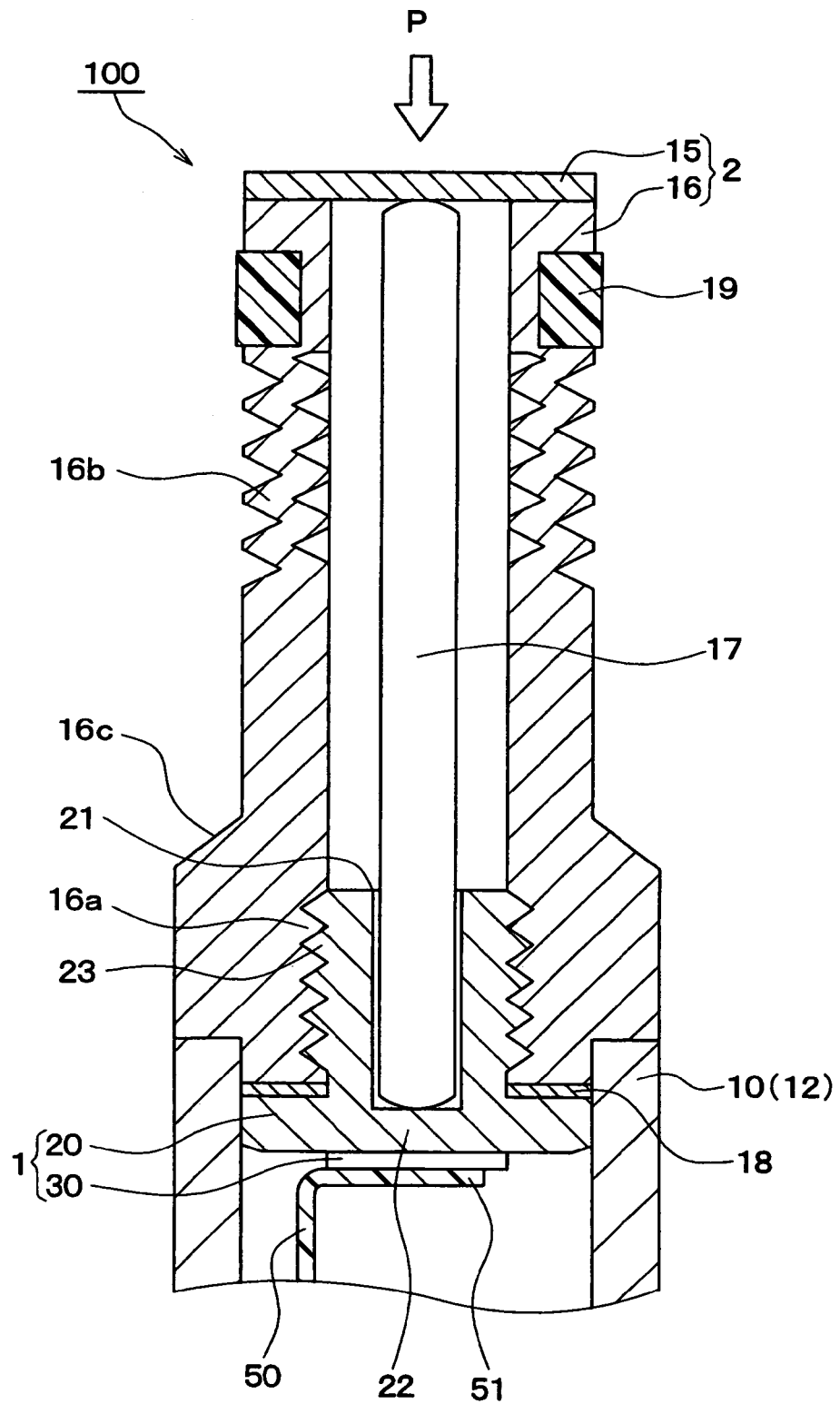
FIG. 2 is an enlarged schematic sectional view showing a part of the pressure detection device in FIG. 1.

In a state where this pressure detection device 100 is mounted to the engine block 200, as shown by a hollow arrow in FIG. 1 and FIG. 2, the pressure (cylinder pressure) P in the combustion chamber 202 as the detection pressure is applied to the above-described pressure receiving diaphragm 15 from the tip of the pipe portion 12.

A detection element 30 as a sensing part for outputting an electric signal responsive to the applied pressure is mounted on a top portion of the pipe portion 12 in the housing 10.

This detection element (sensing part) 30 is made of a semiconductor chip, for example, and can have a strain gauge function such that the detection element 30 itself is deformed by the applied pressure to output a signal responsive to a detection pressure on the basis of its deformation.

In the pressure detection device 100 of the present embodiment, as shown in FIG. 1 and FIG. 2, the detection element 30 is fixed directly to a metal stem 20 as a supporting part. This metal stem 20 is constructed as a metal part made of cobalt or the like and is formed into the shape of a hollow cylinder.

In the present embodiment, the metal stem (supporting part) 20 is a hollow cylinder whose one end is an opening portion 21 and whose other end is a closed by a diaphragm 22 as a thin straining part. The detection element 30 is fixed to the outer surface of the diaphragm 22 of the metal stem 20 by fused glass or the like.

As shown in FIG. 2, a threaded portion 23 as a male thread is formed on the outer peripheral surface of the metal stem 20. It is assumed in this example that the hollow portion of the metal stem 20 is cylindrical, but the hollow portion of this metal stem 20 may be also square.

The metal stem 20 is inserted into the pipe portion 12 such that the diaphragm 22 is faced to the inside of the pipe portion 12 and the opening portion 21 is faced toward the combustion chamber 202. Moreover, as shown in FIG. 1 and FIG. 2, a metal case 16 as a cylinder part formed in a cylindrical shape is joined and fixed by welding or the like to the tip portion of the pipe portion 12 in the housing 10.

This metal case (cylinder part) 16 is formed from a plate made of metal, for example, stainless steel into a cylindrical shape. One end portion (bottom end in FIG. 1 and FIG. 2) on the pipe portion 12 side in the metal case 16 is so arranged as to surround the outer periphery of the opening portion 21 of the metal stem 20.

Moreover, a threaded portion 16a as a female thread is formed on the inner peripheral surface on the one end side of the metal case 16, and the threaded portion 16a of this metal case 16 and the threaded portion 23 of the metal stem 20 are joined to each other by screwing.

As shown in FIG. 2, a washer 18 that is formed of metal in the shape of a ring is interposed between the one end portion of the metal case 16 and the metal stem 20. This washer 18 prevents the screw joint between the metal case 16 and the metal stem 20 from being loosened.

In this manner, the detection element 30 is connected and fixed to the one end portion of the metal case 16 via the metal stem 20. The hollow portion of the metal case 16 communicates with the opening portion 21 of the metal stem 20 and the one end portion of the metal case 16 is closed by the diaphragm 22 of the metal stem 20.

Moreover, in the present embodiment, as shown in FIG. 1 and FIG. 2, a spring portion 16b is formed on the side surface of the metal case 16. The elastic force of this spring portion 16b is adapted to act in a direction that connects both ends of the metal case 16 (in an up and down direction in FIG. 1 and FIG. 2, that is, in the axial direction of the cylindrical metal case).

In other words, the metal case 16 has a bellows structure in which metal case 16 itself can be elastically extended and contracted by the spring portion 16b in the direction that connects both ends of the metal case 16 itself. Here, the spring portion 16b of the metal case 16 is formed in the shape of bellows and the spring portion 16b like this can be molded.

A sealing surface 16c is formed between the spring portion 16b and the one end portion (lower end portion) of the outer peripheral surface of the metal case 16. Here, the sealing surface 16c is a tapered surface formed in the shape of a taper whose diameter is extended from the spring portion 16b to the one end portion of the metal case 16.

When the pressure detection device 100 is joined by screwing to the engine block 200, this sealing surface 16c is pressed onto and hence brought into close contact with the inner surface of the threaded hole portion 201 by an axial force. Accordingly, a sealing between this sealing surface 16c and the engine block 200 can be performed.

The above-described pressure receiving diaphragm 15 that receives pressure is provided on the other end (top end in FIG. 1 and FIG. 2) of the metal case 16. The other end of the metal case 16 is also closed by this pressure receiving diaphragm 15.

This pressure receiving diaphragm 15 is made of metal such as stainless steel in the shape of a circular plate and its peripheral portion is joined and fixed to the other end of the metal case 16 by brazing, welding, or the like.

Accordingly, the pressure receiving diaphragm 15 is integrated with the metal stem 20 via the metal case 16. As shown by hollow arrows in FIG. 1 and FIG. 2, this pressure receiving diaphragm 15 faces the above-described combustion chamber and receives the combustion pressure (cylinder pressure) P, thereby being strained.

A hot-air interruption ring 19 is interposed between the spring portion 16b and the other end portion of the outer peripheral surface of the metal case (cylinder part) 16 in an axial direction. The hot-air interruption ring 19 is formed of heat resistant resin such as PTFE (polytetrafluoroethylene) in the shape of a ring and is pressed into a groove formed on the outer peripheral surface of the metal case 16, thereby being fixed to the metal case 16.

The hot-air interruption ring 19 is in air-tightly contact with the inner surface of the threaded hole portion 201 in a state where it is mounted on the engine block 200 of the pressure detection device 100 to thereby prevent the entry of hot air and deposit from the combustion chamber 202.

Moreover, a pressure transmission part 17 is provided in a space formed by the hollow portion of the metal stem 20 and the hollow portion of the metal case 16. In the present example, the pressure transmission part 17 is a part formed in the shape of a bar.

In this manner, the pressure transmission part 17 is interposed between the pressure receiving diaphragm 15 and the diaphragm 22 as a pressure sensing part of the metal stem 20. This pressure transmission part 17 is made of metal such as stainless steel, ceramic, or the like.

The one end (bottom end in FIG. 1 and FIG. 2) of the pressure transmission part 17 is in contact with the diaphragm 22 of the metal stem 20 in the state where a pre-load is applied to the diaphragm 22 of the metal stem 20 and the other end (top end in FIG. 1 and FIG. 2) of the pressure transmission part 17 is in contact with the pressure receiving diaphragm 15 in the state where the pre-load is applied to the pressure receiving diaphragm 15.

Although the pressure transmission part 17 is a bar-shaped part in this example, it is not limited to this shape but may be a part formed in the shape of a sphere, a semi-sphere, or a drum. The detection pressure P is applied from the pressure receiving diaphragm 15 to the diaphragm 22 of the metal stem 20 and the detection element 30 via the pressure transmission part 17.

Moreover, as the detection element 30 having a strain gauge function, although not limited, for example, an element can be employed in which a bridge circuit constructed of a diffused resistance element and the like is formed on a silicon semiconductor chip by a semiconductor process.

The semiconductor chip having the strain gauge function like this has a function such that when the diaphragm 22 as the pressure sensing part of the metal stem 20 is deformed by pressure, the semiconductor chip itself is strained to develop a change in resistance and converts the change in resistance to an electric signal and outputs the electric signal.

In the present embodiment, this detection element 30 is constructed as a sensing part that outputs an electric signal responsive to the pressure applied thereto, and these detection element 30 and diaphragm 22 of the metal stem 20 are constructed as parts that receive load applied by the detection pressure P, thereby being strained. The diaphragm 22 and the detection element 30 have an effect on the fundamental function of the pressure detection device 100.

Further describing a metal material constructing the metal stem 20, the metal material is required to have high strength because it receives high pressure and to have a low coefficient of thermal expansion because the detection element 30 made of Si semiconductor or the like is bonded to the metal stem 20 by glass having a low melting point or the like.

Specifically, as the metal material constructing the metal stem 20, a material including Fe, Ni, Co or Fe, Ni as main components and having Ti, Nb, Ai or Ti, Nb added thereto as precipitation hardening components, for example, precipitation hardening stainless steel can be selected. This metal stem 20 can be formed by pressing, cutting, or cold forging.

In the pressure detection device 100, the above-described pressure element (sensing part) 30 and the metal stem (supporting part) 20 are constructed as a first part 1 having the sensing part 30 that outputs an electric signal responsive to the applied pressure.

On the other hand, in the present pressure detection device 100, the above-described pressure receiving diaphragm 15 and the metal case (cylinder part) 16 integrated accordingly, are constructed as a second part 2 having the diaphragm 15 that receives pressure.

In the pressure detection device 100 of the present embodiment, the pressure transmission part 17 is interposed between the detection element 30, which is the sensing part, and the pressure receiving diaphragm 15 and the first part 1 is joined to the second part 2 in the state where the pressure receiving diaphragm 15 applies a pre-load to the detection element 30 via the pressure transmission part 17.

The first part 1 has the hollow cylindrical metal stem 20 having the opening portion 21 at the one end and having the detection element 30 as the sensing part 30 mounted on the other end. The second part 2 has the hollow cylindrical metal case 16 having an opening at one end and having the diaphragm 15 mounted on the other end. The metal stem 20 is joined by screwing to the one end portion of the metal case 16, thereby the pressure transmission part 17 is arranged in the metal case 16.

As shown in FIG. 1, in the present pressure detection device 100, a circuit board 40 made of a ceramic board or the like is provided in the main portion 11 of the housing 10.

The circuit board 40 is provided in such a way as to cover the opening of the pipe portion 12 at the boundary between the pipe portion 12 and the main portion 11, and the peripheral portion of the circuit board 40 is fixed to the housing 10, for example, by bonding.

An IC chip 42 is mounted by bonding or the like on a surface facing the opening of the pipe portion 12 in the circuit board 40. The IC chip 42 is provided such that a circuit for amplifying and adjusting the output from the detection element 30 is formed thereon.

The IC chip 42 and the circuit board 40 are connected to each other by bonding wires 44 made of aluminum (Al) or gold, thereby being electrically connected to each other. As shown in FIG. 1 and FIG. 2, this circuit board 40 is electrically connected to the above-described element 30 by a wiring part 50.

Here, a flexible printed board (FPC) 50 is employed for a wiring part 50. Of course, a member other than the FPC, for example, a lead wire may be employed for the wiring part.

A general board made by patterning an electric conductor made of copper or the like on a base made of polyimide resin can be used for the flexible printed board 50. As shown in FIG. 1, the flexible printed board 50 is arranged in the pipe part 12 of the housing 10 in such a way as to extend in the longitudinal direction of the pipe portion 12.

One end portion 51 of the flexible printed board 50 is electrically and mechanically bonded to the detection element 30 by the use of solder or the like. Specifically, although not shown, the conductor portion of the flexible printed board 50 is connected to a pad formed on the surface of the detection element 30.

The flexible printed board 50 is bent at one end portion 51 that is a portion bonded to the detection element 30 is extended toward the circuit board 40 in the pipe portion 12.

On the other hand, a portion on the side of the other end portion 52 of the flexible printed board 50 is located in the main portion 11 of the housing 10. The other end portion 52 of the flexible printed board 50 passes through a through hole 46 formed in the circuit board 40 and is on a surface opposite to a surface on which the IC chip 42 is mounted in the circuit board 40.

The other end portion 52 of the flexible printed board 50 is electrically connected to the circuit board 40 via solder or the like on the surface opposite to the surface on which the IC chip 42 is mounted in the circuit board 40.

As shown in FIG. 1, a connector case 60 having a terminal 61 is provided at a position opposed to a surface connected to the flexible printed board 50 in the circuit board 40 in the housing 10.

This connector case 60 is made of resin such as PPS (polyphenylene sulfide) and the terminal 61 is integrated with the connector case 60 by insertion molding or the like. This connector case 60 is constructed as a connector part for taking out a signal from the detection element 30.

The terminal 61 of the connector case 60 is electrically connected to the circuit board 40 by spring contact via a spring part 62. Accordingly, the detection element 30 is electrically connected to the terminal 61 of the connector case 60 via the flexible printed board 50 and the circuit board 40.

As shown in FIG. 1, the end portion 14 of the main portion 11 of the housing 10 is caulked and pressed onto the connector case 60, thereby the connector case 60 is fixedly integrated with the housing 10.

The terminal 61 can be connected to the ECU of an automobile or the like via a wiring part (not shown). Accordingly, the pressure detection device 100 can send or receive a signal to or from the outside.

The pressure detection device 100, as described above, is inserted into the threaded hole portion 201 formed in the engine block 200, and the threaded portion 13 formed on the outer peripheral surface of the housing 10 is screwed in the threaded portion 203 formed on the inner peripheral surface of the threaded hole portion 201, thereby being joined by screwing to the engine block 200.

At this time, to prevent a pressure leak from the combustion chamber 202, the sealing surface 16c, which is a tapered surface formed on the outer peripheral surface of the metal case 16 of the pressure detection device 100, air-tightly contacts the tapered surface on the threaded hole portion 201 side to thereby seal the engine block 200.

When the pressure (cylinder pressure) in the combustion chamber is applied to the pressure receiving diaphragm 15, as shown by the hollow arrow in FIG. 1 and FIG. 2, the pressure transmission part 17 is pressed in toward the detection element 30 by the spring deformation of the spring part 16b of the metal case 16.

For this reason, the pressure from the pressure receiving diaphragm 15 is applied to the diaphragm 22 of the metal stem 20 via the pressure transmission part 17. Then, the diaphragm 22 of the metal stem 20 is deformed by the pressure and the detection element 30 converts this deformation to an electric signal responsive to the pressure.

The electric signal outputted from the detection element 30 is transmitted to the circuit board 40 via the flexible printed board 50 and is processed by the IC chip 42 and a processed signal is outputted from the terminal 61 to the outside. The pressure detection by the pressure detection device 100 is performed in this manner.

A specific example of a method of manufacturing the pressure detection device 100 will be described with reference to FIG. 1 and FIG. 2 described above.

First, the detection element 30 is bonded to the surface of the diaphragm 22 of the metal stem 20 by the use of glass and then the one end portion 51 of the flexible printed board 50 is connected via solder or the like to the detection element 30 integrated with the metal stem 20. In this manner, the first part 1 having the sensing part (30) is formed.

On the other hand, the other end portion of the metal case 16 is joined and fixed to the pressure receiving diaphragm 15 by brazing, welding, or the like. In this manner, the metal case 16 is integrated with the pressure receiving diaphragm 15 to form the second part 2 having the pressure receiving diaphragm 15.

Next, the pressure transmission part 17 is interposed between the detection element 30 that is the sensing part and the pressure receiving diaphragm 15, as shown in FIG. 2, and the metal stem 20 is joined to the metal case 16 by screwing via their threaded portions 23, 16a and the washer 18.

The threaded portion 23 of the metal stem 20 is screwed in the threaded portion 16a of the metal case 16 to apply a pre-load between the pressure receiving diaphragm 15, the pressure transmission part 17, and the diaphragm 22 and the detection element 30 of the metal stem 20. Thus, the pre-load can be adjusted by adjusting the amount of screwing-in.

In this manner, the joining of the first part 1 to the second part 2 is completed to thereby form a unit into which the pressure receiving diaphragm 15, the metal case 16, the pressure transmission part 17, the metal stem 20, the detection element 30, and the flexible printed board 50 are integrated.

Next, a portion on the other end portion 52 side of the flexible printed board 50 in the above-described unit is inserted into the pipe portion 12 of the housing 10 from its tip, and the other end portion 52 of the flexible printed board 50 is pulled out into the main portion 11 of the housing 10.

Moreover, the one end of the metal case 16 is bonded to the tip of the pipe portion 12 by welding or the like in the state where the flexible printed board 50 is inserted into the housing 10.

Next, the other end portion 52 of the flexible printed board 50 is passed through the through hole 46 of the circuit board 40 having the IC 42 by wire bonding, and the other end portion 52 of the flexible printed board 50 is connected to the circuit board 40 by solder or the like.

Next, the circuit board 40 is joined and fixed to the main portion 11 of the housing 10. Then, the connector case 60 is connected to the main portion 11 of the housing 10, and the end portion 14 of the housing 10 is caulked to fix the connector case 60 to the housing 10.

When the connector 60 is attached to the housing 10, the terminal 61 is put into spring contact with the circuit board 40 via the spring part 62, thereby being electrically connected to the circuit board 40. In this manner, the pressure detection device 100 shown in FIG. 1 is completed.

According to the present embodiment, there is provided the pressure detection device 100 that includes: the detection element 30 as the sensing part that outputs an electric signal responsive to an applied pressure; the pressure receiving diaphragm 15 that receives pressure; the cylindrical metal case 16 that is formed in a cylindrical shape and has the detection element 30 fixed to its one end portion and has the pressure receiving diaphragm 15 fixed to its other end portion; and the pressure transmission part 17, which is provided in the metal case 16 and transmits the pressure received by the pressure receiving diaphragm 15 to the detection element 30, and is in a state where the pressure transmission part 17 is interposed between the detection element 30 and the pressure receiving diaphragm 15 and where the pressure receiving diaphragm 15 applies a pre-load to the detection element 30 via the pressure transmission part 17. In the pressure detection device 100, the metal case 16 has the spring portion 16b on the side portion thereof, and the elastic force of this spring portion 16b acts in the direction (axial direction) that connects both the ends of the metal case 16.

According to this pressure detection device 100, since the elastic force of the spring portion 16b acts in the direction that connects both the ends of the metal case 16, the pre-load between the pressure receiving diaphragm 15, the pressure transmission part 17, and the detection element 30 is held and fluctuations in the pre-load is absorbed. The fluctuations are caused by difference in the thermal expansion between these parts by the spring characteristic of the spring part 16b of this metal case 16.

For example, when temperature increases to deform the pressure transmission part 17 in such a way as to elongate in FIG. 1 and FIG. 2, this deformation can be absorbed by the spring deformation of the spring portion 16b of the metal case 16.

Since the metal case 16 is located closer to the back of the combustion chamber 202 that is a measurement environment than the pressure receiving diaphragm 15, in the spring portion 16b of the metal case 16, it is possible to prevent the spring characteristic from being varied by heat, the adhesion of deposit, or the like to the extent possible.

In the pressure detection device 100 of the present embodiment, the spring portion 16b of the metal case 16 can have the function of holding a pre-load and the function of absorbing fluctuations in the pre-load caused by the difference in the thermal expansion, both of which are conventionally held by a pressure receiving diaphragm in the related art. Therefore, the pressure receiving diaphragm 15 can be made of a plate that does not have spring characteristic and has high rigidity.

For this reason, even if the pressure receiving diaphragm 15 has heat applied thereto or has deposits thereon, the pressure receiving diaphragm 15 can be prevented from being deformed or changed in rigidity. Moreover, even if an excessive load is applied to the pressure receiving diaphragm 15, the pressure receiving diaphragm 15 having high rigidity can be prevented from being plastically deformed.

In the pressure detection device 100 used as a combustion pressure sensor of the present embodiment, the pressure receiving diaphragm 15 plays a role to be exposed to the measurement environment and to receive flame, and has the function of receiving pressure and the function of transmitting pressure, but does not need to have spring characteristic. Accordingly, the diaphragm does not present a problem relating to the spring characteristic in the pressure receiving diaphragm.

Hence, in the present embodiment, it is possible to avoid fluctuations in the spring characteristic of the pressure receiving diaphragm such as a change in the linearity of the spring characteristic, which is caused by heat and the adhesion of deposits in the conventional pressure receiving diaphragm, and hence to realize the spring characteristic of the pressure receiving diaphragm in which fluctuations caused by heat and the adhesion of deposits can be effectively prevented by the spring portion 16b formed on the metal case 16.

Therefore, according to the present embodiment, in the pressure detection device 100, the pressure receiving diaphragm 15 and the detection element 30 sandwich the pressure transmission part 17 to put the pressure transmission part 17 into contact with the pressure receiving diaphragm 15 and the detection element 30 in the state of applying a pre-load to thereby construct a pressure transmission mechanism. Therefore, it is possible to prevent fluctuations in the spring characteristic acting on the pressure transmission mechanism and hence to reduce a bad effect on sensor characteristics.

In the pressure detection device 100 of the present embodiment, the sealing surface 16c, which is pressed onto the threaded hole portion 201 of the engine block 200 to seal the engine block 200 when the device 100 is mounted on the engine block 200 as a body having some part mounted thereon, is formed on the outer peripheral surface of the metal case 16 as the cylinder part, and the detection element 30 as the sensing part is mounted on the metal stem 20 as a supporting part separate from the metal case 16, and the metal stem 20 is joined to the one end portion of the metal case 16.

Figure 12:
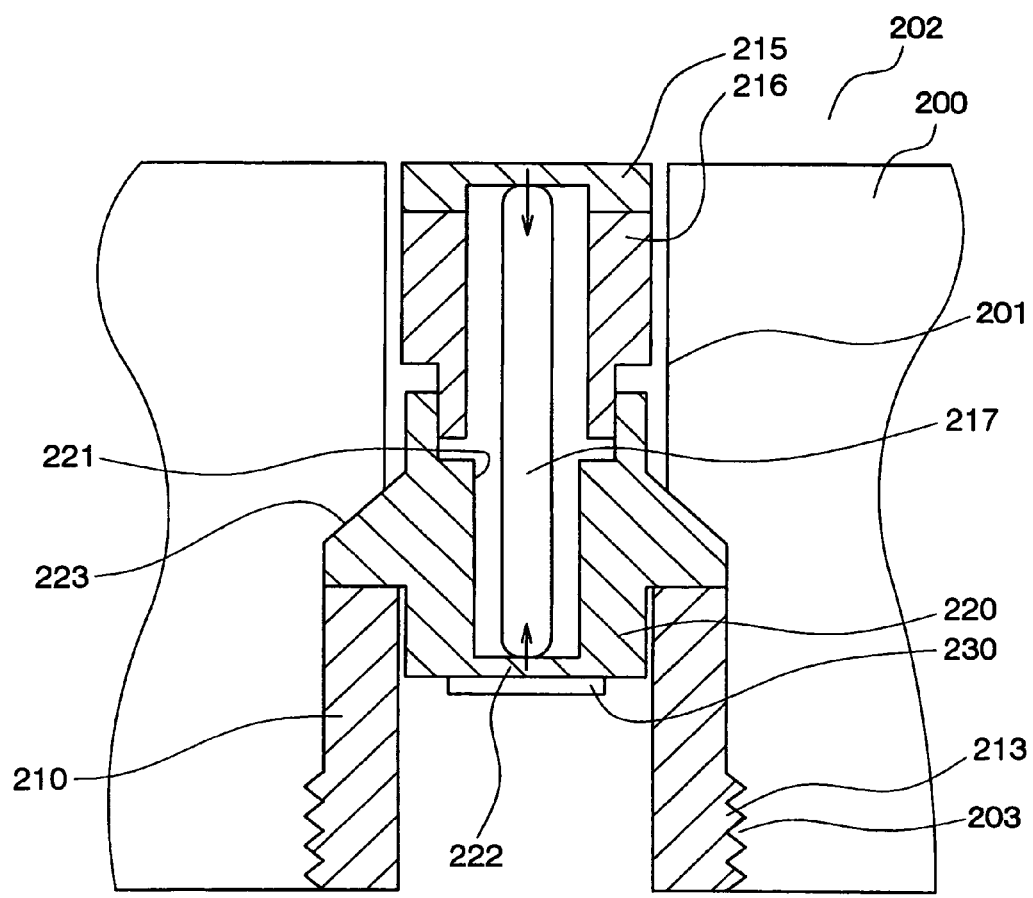
FIG. 12 is a schematic sectional view showing a part of a pressure detection device in a related art.

In the comparative example shown in FIG. 12, the detection element 230 is fixed directly to the metal stem 220 having the sealing surface 223. In this case, when the pressure detection device is mounted on the engine block 200, there is a possibility that the sealing surface 223 is pressed onto the threaded hole portion 201 to deform the metal stem 220, thereby causing mechanical noises. Thus, a bad effect is caused on the detection element 230.

According to the pressure detection device 100 of the present embodiment, when device 100 is mounted on the engine block 200, the metal case 16 having the sealing surface 16c might be deformed by the sealing surface 16c being pressed onto the inner surface of the threaded hole portion 201 but its deformation is hard to be transmitted to the detection element 30 mounted on the metal stem 20 separately formed from the metal case 16.

Therefore, it is possible to reduce such a bad effect on the sensor characteristics, which is produced by mechanical noises when the pressure detection device 100 is mounted on the engine block 200.

In the pressure detection device 100 of the present embodiment, as shown in the above drawings, this metal stem 20 is joined to the metal case 16 by screwing although the metal stem 20 may be joined to the metal case 16 by welding, brazing, adhesion, or the like.

According to this screwing connection, by adjusting the amount of screwing-in, it is possible to adjust a pre-load between the pressure receiving diaphragm 15, the pressure transmission part 17, and the detection element 30, that is, a pre-load applied to the pressure transmission mechanism.

Figure 3:
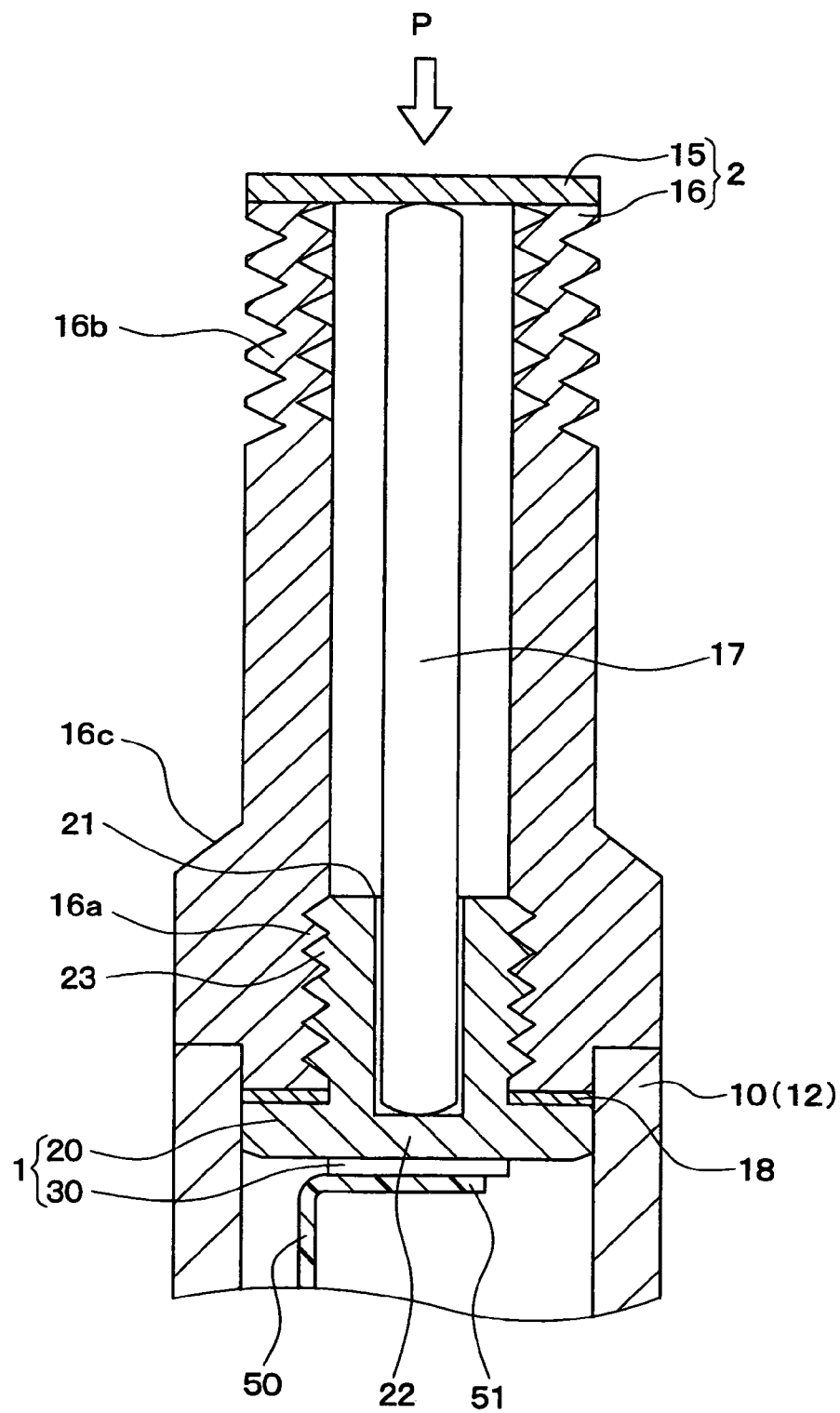
FIG. 3 is a schematic sectional view showing a part of a pressure detection device according to a modification of the first embodiment.

FIG. 3 is an enlarged schematic sectional view showing a part of a pressure detection device as a modification of the present embodiment, near the tip of the pipe portion 12 of the housing 10.

In the example shown in FIG. 1 and FIG. 2, the hot air and the deposits are prevented from entering from the combustion chamber 202 by providing a hot-air interruption ring 19 on the outer peripheral surface of the metal case (cylinder part) 16. However, as shown in FIG. 3, it is also possible to use a construction in which the hot-air interruption ring is omitted. In the example of FIG. 3, the other parts can be made similar to those of the above-described first embodiment.

Second Embodiment

Figure 4:
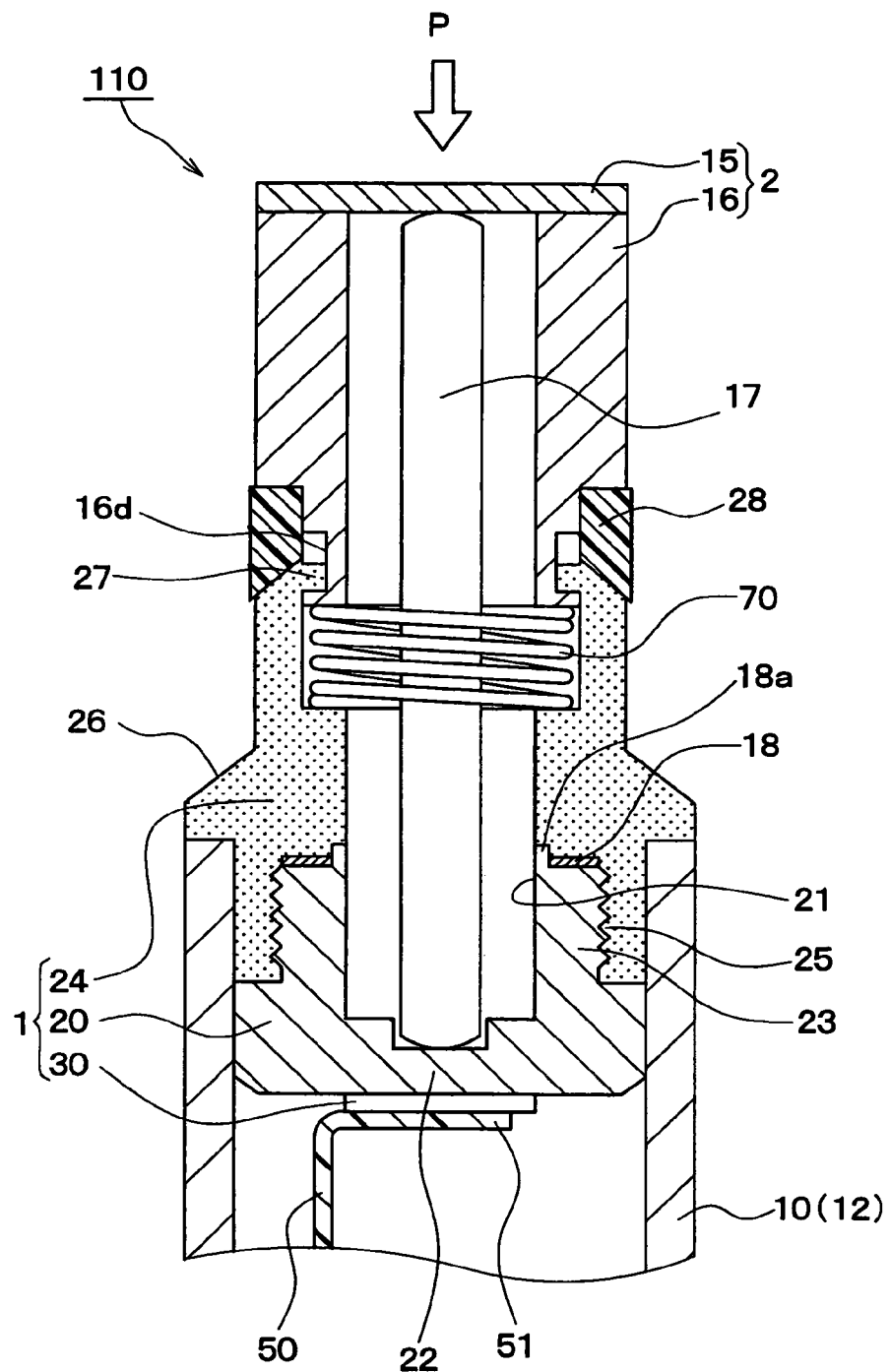
FIG. 4 is a schematic sectional view showing a part of a pressure detection device according to a second embodiment of the present invention.

As shown in FIG. 4, a pressure detection device 110 of the present embodiment includes the first part 1 having the detection element 30 as a sensing part, the second part 2 having the pressure receiving diaphragm 15, and the pressure transmission part 17. The first part 1 and the second part 2 are connected to each other, such that the pressure transmission part 17 is interposed between the detection element 30 and the pressure receiving diaphragm 15, and the pressure receiving diaphragm 15 applies a pre-load to the detection element 30 via the pressure transmission part 17.

In the above-described first embodiment, the first part 1 is constructed of two parts of the detection element 30 and the metal stem 20. However, in the second embodiment, as shown in FIG. 4, the first part 1 is constructed of three parts of the detection element 30, the metal stem 20, and an attachment part 24.

The metal stem 20, as in the above-described first embodiment, is a hollow cylindrical part whose one end has the opening portion 21 and whose other end is closed by a diaphragm 22 as a thin straining part. The detection element 30 is fixed to the outer surface of the diaphragm 22 of the metal stem 20 by fused glass or the like.

The metal stem 20 of the second embodiment is constructed as a supporting part provided with the detection element 30 as the sensing part. Moreover, also in this metal stem 20, a threaded portion 23 as a male thread is formed on the outer peripheral surface. The metal stem 20 is inserted into the pipe portion 12 with its diaphragm 22 side faced to the inside of the pipe portion 12 and with the opening portion 21 faced to the combustion chamber 202.

The attachment part 24, as shown in FIG. 4, is formed in the shape of a cylinder having a step and is bonded and fixed to the pipe portion 12 by welding or the like. One end portion (bottom end portion in FIG. 4) of the attachment part 24 inserted into the tip portion of the pipe portion 12 in the housing 10. This attachment part 24 can be made of, for example, the same metal as the metal stem 20.

A threaded portion 25 as a female thread is formed on the inner peripheral surface on the one end portion of the attachment part 24. The threaded portion 25 of the attachment part 24 and the threaded portion 23 of the metal stem 20 are joined to each other by screwing. Moreover, the washer 18 for preventing the loosening of screwing is interposed between the attachment part 24 and the metal stem 20.

A sealing surface 26 is formed at a portion of the outer peripheral surface of the attachment part 24, protruding from the pipe portion 12 of the housing 10. This sealing surface 26 is a tapered surface having the same tapered shape as the sealing surface 16c (refer to FIG. 2) of the metal case 16 in the above-described first embodiment.

The sealing surface 26 of this attachment part 24 is a surface that is pressed onto the above-described threaded hole portion 201 to thereby seal the engine block 200 when the present pressure detection device 110 is mounted on the above-described engine block 200 as a body having some part mounted thereon.

Moreover, in the pressure detection device 110, similarly to the above-described first embodiment, the second part 2 is constructed of the pressure receiving diaphragm 15 and the metal case 16 integrated with the pressure receiving diaphragm 15, and the other end portion (top end portion in FIG. 4) of the attachment part 24 in the first part 1 is coupled to the one end portion (bottom end portion in FIG. 4) of the metal case 16.

In this manner, the pressure transmission part 17 is interposed between the detection element 30 and the pressure receiving diaphragm 15 in the first part 1 and the second part 2, which are coupled to each other, and the pressure receiving diaphragm 15 applies a pre-load to the detection element 30 via the pressure transmission part 17.

A depressed portion 16d (recess portion) is formed on the outer peripheral surface of the one end portion of the metal case 16 and a protruding portion 27 to be fitted in this depressed portion 16d is formed on the peripheral surface of the other end portion of the attachment part 24. The first part 1 including the attachment part 24 is coupled to the second part 2 including the metal case 16 by engaging the protruding portion 27 with the depressed portion 16d.

Moreover, in the second embodiment, as shown in FIG. 4, the width of the depressed portion 16d of the metal case 16 is made larger than the width of the protruding portion 27 of the attachment part 24 in the axial direction that connects both ends of the metal case 16, that is, in the up and down direction in FIG. 4.

These first and second parts 1, 2 slide relatively to each other and are displaceable along the up and down direction in FIG. 4 because the width of the depressed portion 16d is made larger in a coupling portion where the first part 1 is coupled to the second part 2.

A fitting structure in which the protruding portion 27 can slide in the depressed portion 16b is used in a coupling portion where the first part 1 is coupled to the second part 2, that is, in a coupling portion where the attachment part 24 is coupled to the metal case 16. In this embodiment, a ring-shaped sealing part 28 for sealing this coupling portion is provided. This sealing part 28 can be made of the same heat-resistant resin such as PTFE as the above-described hot-air interruption ring 19.

Further, as shown in FIG. 4, in the present embodiment, a spring part 70 for applying an elastic force to the detection element 30 and the pressure receiving diaphragm 15 in the direction that separates the detection element 30 from the pressure receiving diaphragm 15 (in other words, in the up and down direction in FIG. 4) is interposed between the first part 1 and the second part 2.

Specifically, the spring part 70 of this example is one ring-shaped winding spring surrounding the periphery of the pressure transmission material 17 and made of spring steel or the like. This spring part 70 is provided in a state where it is inserted between a stepped surface formed on the inner peripheral surface of the other end portion of the attachment part 24 and the one end portion of the metal case 16, as shown in FIG. 4.

By interposing the spring part 70 in this manner, the elastic force of the spring part 70 acts in the direction in which the attachment part 24 and the metal case 16 pull each other, that is, are separated from each other.

When the pressure (cylinder pressure) P in the combustion chamber is applied to the pressure receiving diaphragm 15 in the present embodiment, as shown by arrow in FIG. 4, the metal case 16 to which the pressure receiving diaphragm 15 is fixed is displaced in the direction toward the attachment part 24 to thereby press the spring part 70, so the spring part 70 is so deformed as to be contracted.

Accordingly, pressure from the pressure receiving diaphragm 15 is applied to the diaphragm 22 of the metal stem 20 via the pressure transmission part 17 to deform the diaphragm 22 of the metal stem 20, thereby an electric signal of a level responsive to the pressure is outputted from the detection element 30. For this reason, in the pressure detection device 110 of the present embodiment, pressure detection can be appropriately carried out.

In this manner, according to the present embodiment, there is provided the pressure detection device 110 that includes the first part 1 having the detection element 30 as the sensing part, the second part 2 having the pressure receiving diaphragm 15, and the pressure transmission part 17 interposed between the detection element 30 and the pressure receiving diaphragm 15. Further, the first part 1 is coupled to the second part 2 in a state where the pressure receiving diaphragm 15 applies a pre-load to the detection element 30 via the pressure transmission part 17. In the pressure detection device 110, the spring part 70 applying an elastic force to the detection element 30 and the pressure receiving diaphragm 15 in the direction that separates the detection element 30 and the pressure receiving diaphragm 15 from each other is interposed between the first part 1 and the second part 2.

In the pressure detection device 100 of the above-described first embodiment, the spring part 16b is provided on the metal case 16 that is a part of the first part 1 (refer to FIG. 1 and FIG. 2). However, the this embodiment is mainly different from the first embodiment in that the spring part 70 corresponding to the spring part 16b is interposed between the first part 1 and the second part 2.

According to this construction of the second embodiment, the elastic force of the spring part 70 is applied to the detection element 30 and the pressure receiving diagram 15 in the direction that separates the detection element 30 and the pressure receiving diagram 15 from each other. Hence, by the spring characteristic of the spring part 70, pre-load applied between the pressure receiving diaphragm 15, the pressure transmission part 17, and the detection element 30 is held and fluctuations in the pre-load caused by the difference in thermal expansion between these parts are absorbed.

The spring part 70 is interposed between the first part 1 and the second part 2 and hence is located closer to the back of the above-described combustion chamber, which is the measurement environment, than the pressure receiving diaphragm 15. Therefore, it is possible to restrict the spring characteristic of the spring part 70 from being varied by heat and the adhesion of deposits.

In other words, in the present embodiment, the spring part 70 can perform the function of holding the pre-load and the function of absorbing fluctuations in the pre-load caused by the difference in thermal expansion. Therefore, the pressure receiving diaphragm 15 can be formed from a plate having no spring characteristic and having high rigidity.

Therefore, in the present embodiment, it is possible to avoid the problem of fluctuations in the spring characteristic of the pressure receiving diaphragm such as a change in the linearity of spring characteristic, which is caused by heat, and the adhesion of deposits in a conventional pressure receiving diaphragm. Thus, fluctuations caused by heat and the adhesion of deposits are effectively restricted by the spring part 70.

In the pressure detection device 110, the pressure receiving diaphragm 15 and the detection element 30 sandwich the pressure transmission part 17 to put the pressure transmission part 17 into contact with the pressure receiving diaphragm 15 and the detection element 30 in the state of applying the pre-load, so as to construct a pressure transmission mechanism. Therefore, it is possible to prevent fluctuations in the spring characteristic acting on this pressure transmission mechanism and to reduce a bad effect on the sensor characteristics.

Moreover, in the pressure detection device 110 of the present embodiment, the first part 1 includes the metal stem 20 as the supporting part, to which the detection element 30 as the sensing part is mounted, and the attachment part 24 having the sealing surface 26. The sealing surface 26 is pressed onto the threaded hole portion 201 to seal the engine block 200 when the device 110 is mounted to the engine block 200, and the attachment part 24 is joined to the metal stem 20.

In other words, in the above-described first embodiment, the sealing surface 16c is formed on the metal case 16 that is the second part, whereas the present embodiment is different from the first embodiment in that the attachment part 24 is additionally provided as one constituent part of the first part 1 and has the sealing surface 26 formed thereon.

According to this construction of the present embodiment, there is a possibility that when the pressure detection device 110 is mounted to the engine block 200, the attachment part 24 having the sealing surface 26 may be deformed by the sealing surface being pressed onto the inner surface of the threaded hole portion 201, but its deformation is unlikely to be transmitted to the detection element 30 mounted on the metal stem 20 that is separated from the attachment part 24.

Therefore, in the second embodiment, it is possible to reduce such a bad effect on the sensor characteristic, which is produced by mechanical noises caused when the pressure detection device 110 is mounted on the engine block 200.

Moreover, it is also one of features in the pressure detection device 110 of the present embodiment that the metal stem 20 is joined to the attachment part 24 by screwing, as shown in the above example, although the metal stem 20 can be joined to the attachment part 24 by welding, brazing, bonding, or the like.

According to this construction of the second embodiment, as in the above-described first embodiment, it is possible to adjust the pre-load applied to the pressure transmission mechanism.

Figure 5A:
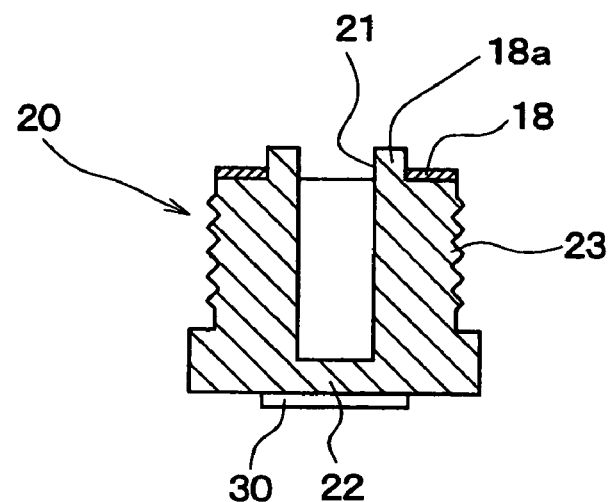
FIGS. 5A and 5B are a sectional view and a top view showing a metal stem used for the pressure detection device according to the second embodiment.
Figure 5B:
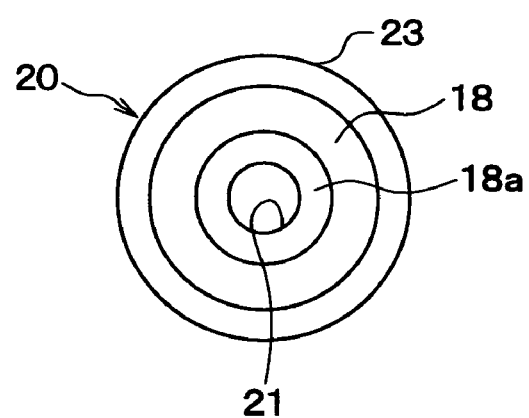

Moreover, in the example shown in FIG. 4, the protruding part 18a for positioning the washer 18 is provided on the edge portion of the opening portion 21 of the metal stem 20. FIGS. 5A, 5B show the construction of a part of the metal stem 20 provided with the protruding part 18a for positioning this washer 18.

If there is provided such a protruding part 18a for positioning the washer 18 as shown in FIGS. 5A, 5B, the washer 18 can be easily positioned. The protruding part 18a for positioning the washer 18 may be provided on the metal case 16 in which the metal stem 20 is screwed.

Figure 6:
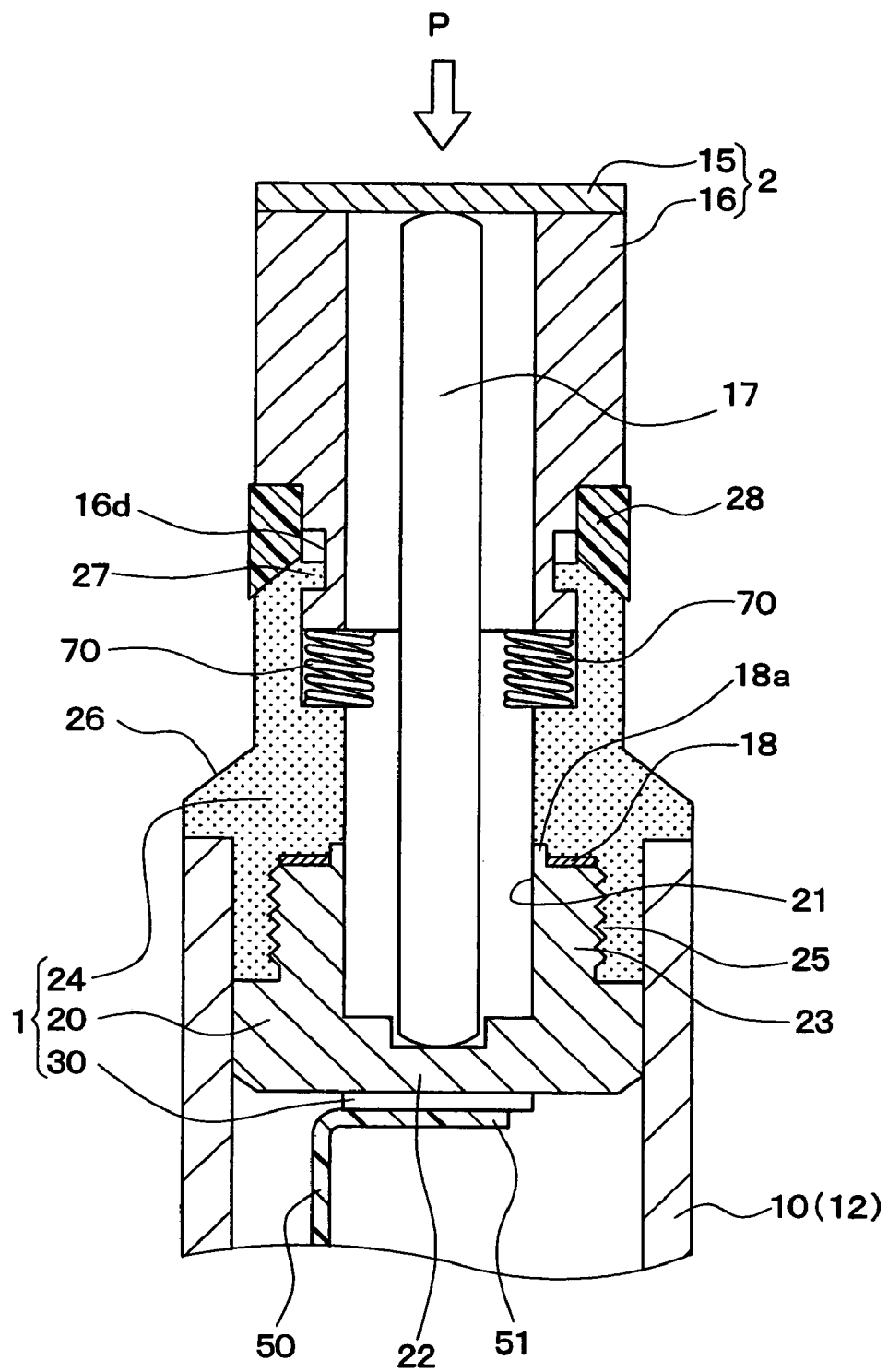
FIG. 6 is a schematic sectional view showing a pressure detection device according to a modification of the second embodiment.

FIG. 6 is an enlarged view of a modification of the second embodiment and shows a portion near the tip of the pipe portion 12 of the housing 10.

The spring part 70 interposed between the first part 1 and the second part 2 is a ring-shaped winding spring wound around the periphery of the pressure transmission part 17 in the example shown in FIG. 4, but it is also possible to provide a plurality of spring parts 70 like the example shown in this FIG. 6.

Third Embodiment

Figure 7:
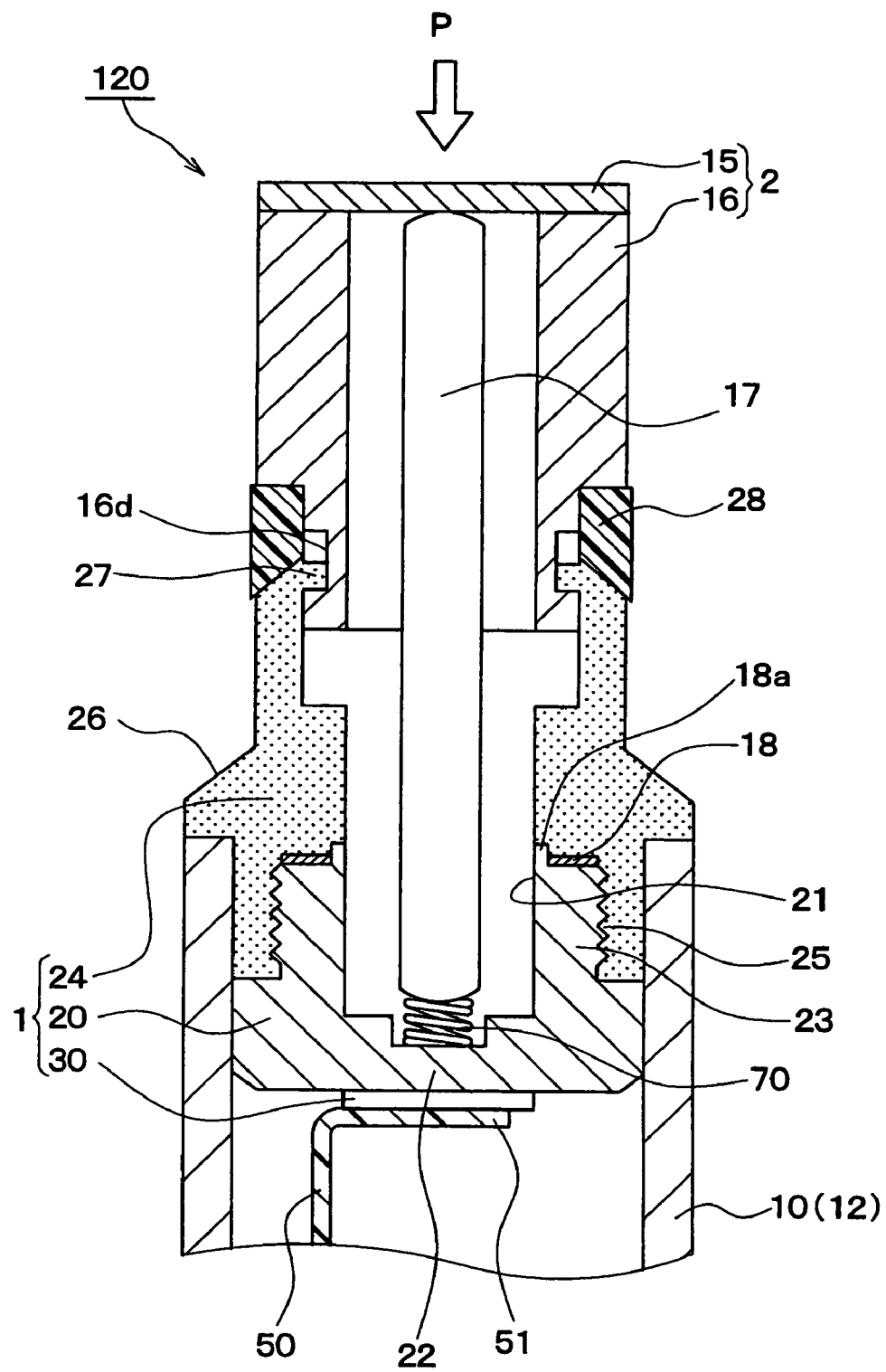
FIG. 7 is a schematic sectional view showing a part of a pressure detection device according to a third embodiment of the present invention.

FIG. 7 shows a pressure detection device 120 of the third embodiment.

The pressure detection device 120 of the present embodiment is a modification of the pressure detection device of the above-described second embodiment. Specifically, the pressure detection device 120 of the present embodiment is mainly different from the second embodiment in that the installation position of the spring part 70 is changed.

As shown in FIG. 7, similarly to the pressure detection device 100, 110 in the above-described first embodiment and second embodiment, the pressure detection device 120 of the present embodiment also includes the first part 1 having the detection element 30 as the sensing part, the second part 2 having the pressure receiving diaphragm 15. Further, the pressure transmission part 17 interposed between the detection element 30 and the pressure receiving diaphragm 15, and the first part 1 is coupled to the second part 2 in a state where the pressure receiving diaphragm 15 applies a pre-load to the detection element 30 via the pressure transmission part 17.

In the pressure detection device 110 of the above-described second embodiment, the spring part 70 that applies an elastic force to the detection element 30 and the pressure receiving diaphragm 15 in the direction that separates the detection element 30 and the pressure receiving diaphragm 15 from each other is interposed between the first part 1 and the second part 2 (refer to FIG. 4 and FIG. 6).

In contrast to this, in the third embodiment, a spring part 70 is interposed between the pressure receiving diaphragm 15 and the pressure transmission part 17, or between the pressure transmission part 17 and the detection element 30 (diaphragm 22).

In the example shown in FIG. 7, the spring part 70 is interposed between the pressure transmission part 17 and the detection element 30 (diaphragm 22). Specifically, the spring part 70 is provided in the hollow portion of the metal stem 20 and is interposed between the inner surface of the diaphragm 22 of the metal stem 20 and the pressure transmission part 17 in such a way as to be sandwiched between them.

A construction in which the spring part 70 is interposed between the pressure receiving diaphragm 15 and the pressure transmission part 17 can be also easily realized by interposing the spring part 70 between the reverse surface of the pressure receiving diaphragm 15 and the pressure transmission part 17.

Also in the third embodiment, the first part 1 and the second part 2 can slide relatively to each other and are displaceable along the up and down direction (axial direction) in FIG. 7 because the width of the depressed portion 16d in the axial direction is made larger in a portion where the first part 1 is coupled to the second part 2.

By interposing the spring part 70 in this manner, the elastic force of the spring part 70 is applied to the attachment part 24 and the metal case 16 in the direction in which the attachment part 24 and the metal case 16 pull each other, that is, are separated from each other.

In the present embodiment, when the pressure (cylinder pressure) P in the combustion chamber is applied to the pressure receiving diaphragm 15, as shown by arrow in FIG. 7, the pressure transmission part 17 is displaced toward the diaphragm 22 of the metal stem 20, that is, toward the detection element 30 to thereby press the spring part 70. Therefore, the spring part 70 is so deformed as to be contracted.

Accordingly, the pressure from the pressure receiving diaphragm 15 is applied to the diaphragm 22 of the metal stem 20 via the pressure transmission part 17 to deform the diaphragm 22 of the metal stem 20, thereby an electric signal of a level responsive to the pressure is outputted from the detection element 30. For this reason, also in the pressure detection device 120 of the present embodiment, pressure detection can be appropriately performed.

In this manner, according to the present embodiment, there is provided the pressure detection device 120 that includes the first part 1 having the detection element 30 as the sensing part, the second part 2 having the pressure receiving diaphragm 15, and the pressure transmission part 17 interposed between the detection element 30 and the pressure receiving diaphragm 15. Here, the first part 1 is coupled to the second part 2 in a state where the pressure receiving diaphragm 15 applies a pre-load to the detection element 30 via the pressure transmission part 17. In the pressure detection device 120, the spring part 70 applying an elastic force to the detection element 30 and the pressure receiving diaphragm 15 in the direction that separates the detection element 30 and the pressure receiving diaphragm 15 from each other is interposed between the pressure receiving diaphragm 15 and the pressure transmission part 17 or between the pressure transmission part 17 and the detection element 30.

In the pressure detection device 120 of the third embodiment, by the spring characteristic of the spring part 70, the pre-load in the pressure transmission mechanism is held and fluctuations in the pre-load caused by the difference in thermal expansion between the respective parts are absorbed.

In the present embodiment, the spring part 70 is interposed between the pressure receiving diaphragm 15 and the pressure transmission part 17 or between the pressure transmission part 17 and the detection element 30 and hence is located closer to the back of the above-described combustion chamber, which is the measurement environment, than the pressure receiving diaphragm 15. Therefore, it is possible to effectively restrict the spring characteristic of the spring part 70 from being varied by heat and the adhesion of deposits.

In other words, in the present embodiment, the spring part 70 can perform the function of holding the pre-load and the function of absorbing fluctuations in the pre-load caused by the difference in thermal expansion, which have been performed by the pressure receiving diaphragm in the related art. Therefore, the pressure receiving diaphragm 15 can be made of a plate having no spring characteristic and having high rigidity.

Then, in the present embodiment, it is possible to avoid the problem of fluctuations in the spring characteristic in a conventional pressure receiving diaphragm, and hence to realize the spring characteristic of the pressure receiving diaphragm in which fluctuations caused by heat and the adhesion of deposits are effectively prevented by the spring part 70.

Therefore, in the pressure detection device 120 in which the pressure receiving diaphragm 15 and the detection element 30 sandwich the pressure transmission part 17 to put the pressure transmission part 17 into contact with the pressure receiving diaphragm 15 and the detection element 30 in the state of applying the pre-load to thereby construct a pressure transmission mechanism, it is possible to prevent fluctuations in the spring characteristic acting on this pressure transmission mechanism and to reduce a bad effect on the sensor characteristics.

Fourth Embodiment

A pressure detection device 130 according to the fourth embodiment will be now described with reference to FIGS. 8 and 9.

Figure 8:
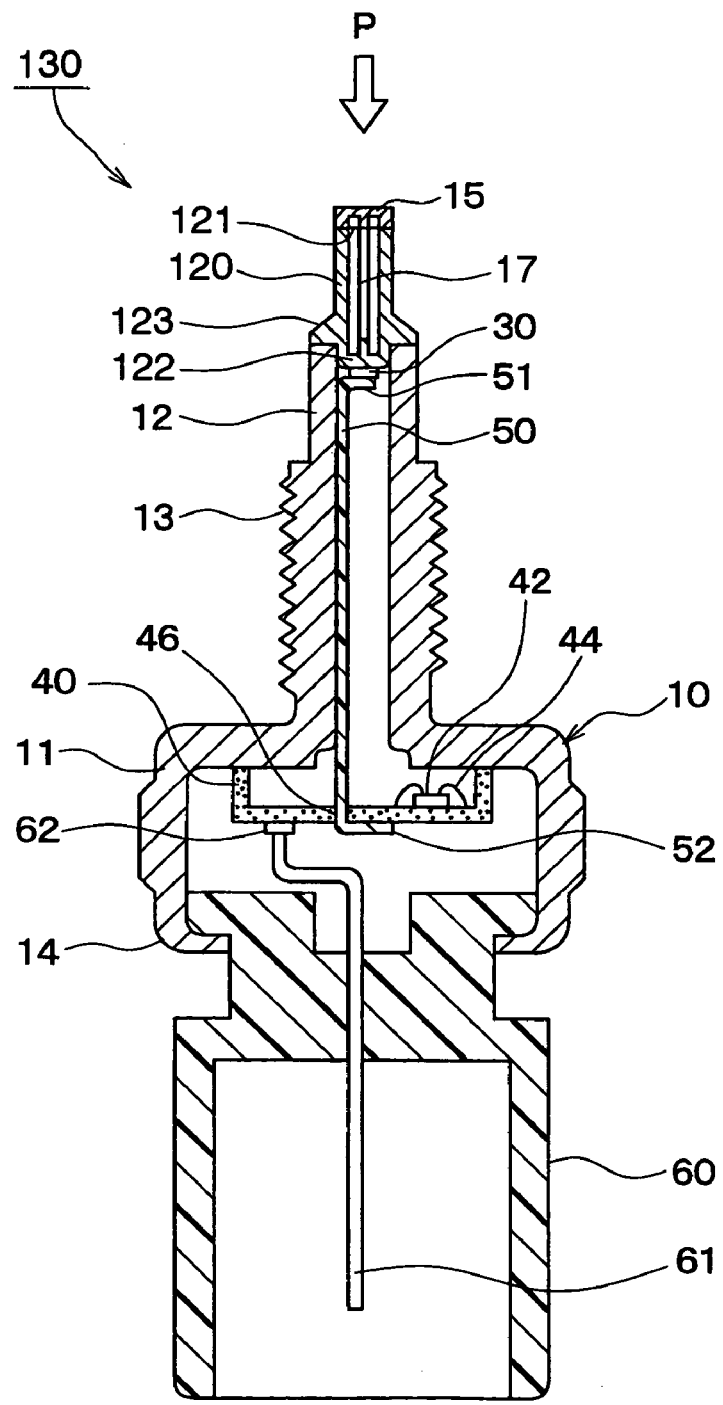
FIG. 8 is a schematic sectional view showing a pressure detection device according to a fourth embodiment of the present invention.
Figure 9:
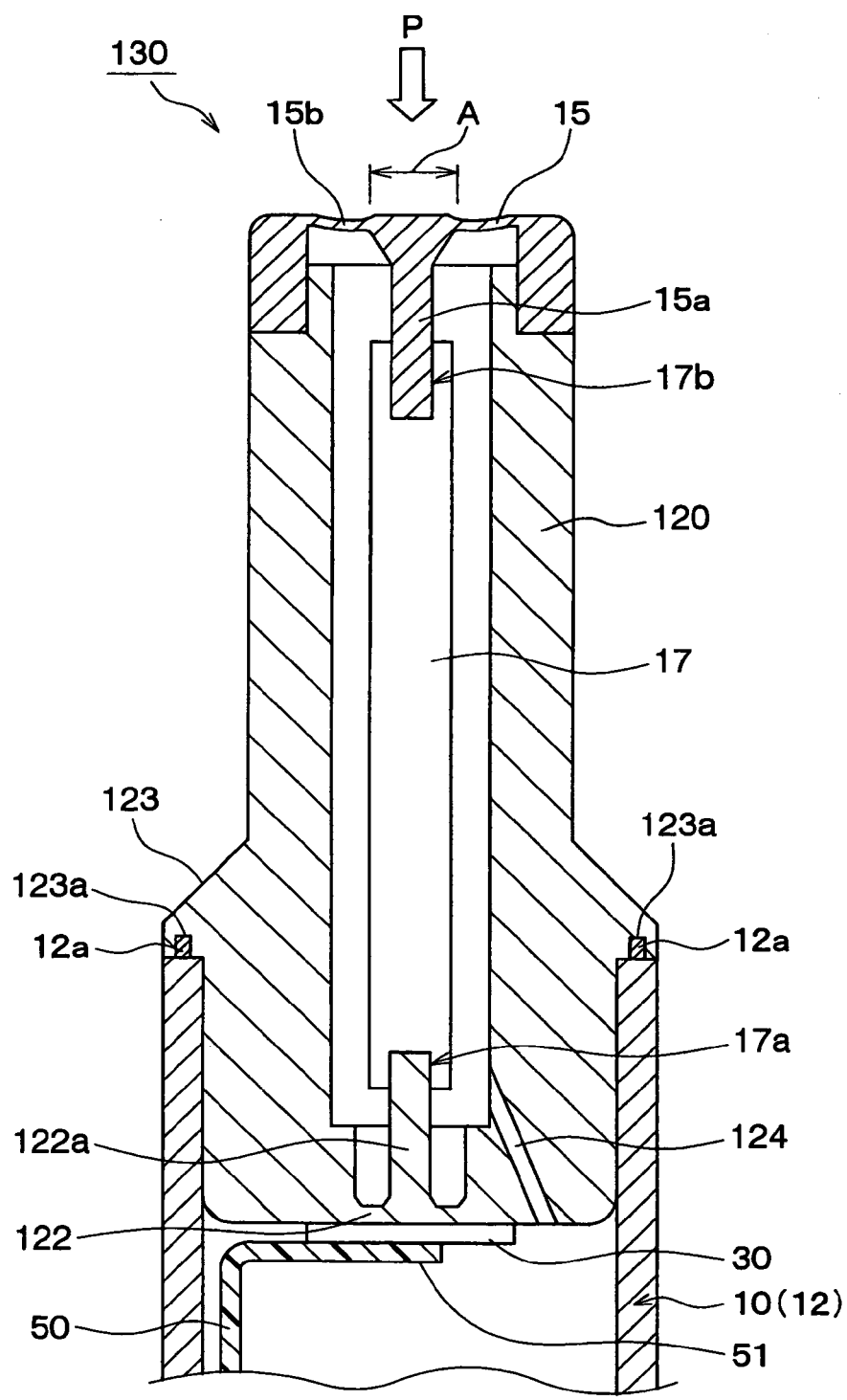
FIG. 9 is an enlarged schematic sectional view showing a part of the pressure detection device in FIG. 8.

As shown in FIG. 8 and FIG. 9, in the pressure detection device 130, the detection element 30 is fixed to a hollow cylindrical metal stem 120 whose one end is an opening portion 121 and whose other end is closed by a thin straining part 122. That is, the straining portion 122 is a portion closing the metal stem 120. The detection element 30 (pressure sensing portion) is bonded to the outer surface of the strain portion 122 by fused glass or the like.

The metal stem 120 is a part made of metal and worked into the shape of a hollow cylinder and has a flange 123 (sealing surface) enlarging in a direction perpendicular to its outer peripheral surface is formed on the outer peripheral surface. In this example, the hollow portion of the metal stem 120 is cylindrical but may be square or other shape.

The metal stem 120 is inserted into the pipe portion 12 such that the straining portion 122 is faced to the inside of the pipe portion 12 and the opening portion 121 is positioned adjacent to the combustion chamber. The flange 123 of the metal stem 120 is joined and fixed to the edge portion of the tip of the pipe portion 12 by welding, bonding, or the like.

Moreover, as shown in FIG. 9, a single or a plurality of protruding portions 12a is or are provided on the tip of the pipe portion 12 of the housing 10 and a single or a plurality of depressed portions 123a is or are provided on the portion(s) of the metal stem 20 corresponding to this protruding portion(s) 12a. However, the protruding portion(s) and the depressed portion(s) 123a may be formed in the other shapes that are different from the above-described shapes and correspond to each other on the portions opposite to each other, and the depressed portion(s) 123a may be formed in the shape of cutout.

In the state where the pipe portion 12 of the housing 10 is joined to the metal stem 120, the protruding portion(s) 12a is (are) fitted in the depressed portion(s) 123a. This can prevent the metal stem 120 and the housing 10 from being shifted in position around the axis of the metal stem 120 from each other by rotation.

The outer peripheral surface of the flange 123 of the metal stem 120 is formed in a tapered surface, so that the diameter of the flange 123 is expanded toward the straining portion 122 from the opening portion 121, as shown in FIG. 8 and FIG. 9. Then, when the pressure detection device 130 is joined to the above-described engine head via the threaded portion 13 by screwing, the tapered surface of this flange 123 is put into air-tightly contact with the inner surface of the mounting hole of the engine head to seal the engine head.

As shown in FIG. 8 and FIG. 9, the pressure receiving diaphragm 15 is provided on the opening portion 121 of the metal stem 120 in such a way as to close the opening portion 121 at the tip of the pipe portion 12 of the housing 10.

This pressure receiving diaphragm 15 is formed of metal such as stainless steel in the shape of a circular disc, and the peripheral portion of the pressure receiving diaphragm 15 is joined and fixed to the portion on the opening portion 121 of the metal stem 120 by brazing, welding, or the like.

Accordingly, the pressure receiving diaphragm 15 is integrated with the metal stem 120. The pressure receiving diaphragm 15 faces the above-described combustion chamber and receives combustion pressure (cylinder pressure) P as shown by the hollow arrows in FIGS. 8 and 9, thereby being strained and deformed.

The pressure transmission part 17 is provided in the hollow portion of the metal stem 120. That is, the pressure transmission part 17 is interposed between the pressure receiving diaphragm 15 and the staining portion 122 of the metal stem 120. This pressure transmission part 17 is made of metal, for example, stainless steel, ceramic, or the like.

The one end portion of the pressure transmission part 17 is integrated with and fixed to the straining portion 122 of the metal stem 120, and the other end portion of the pressure transmission part 17 is integrated with and fixed to the pressure receiving diaphragm 15.

In the present embodiment, a fixing portion 17a where the straining portion 122 of the metal stem 120 is connected to one end portion of the pressure transmission part 17 is constructed by joining the parts by brazing, welding, or the like, and a fixing portion 17b where the pressure receiving diaphragm 15 and the other end portion of the pressure transmission part 17 is also constructed by joining the parts by brazing, welding, or the like.

Specifically, a bar-shaped portion 122a extending to the pressure transmission part 17 from the inner surface of the straining portion 122 of the metal stem 120 is provided on the inner surface. Then, the bar-shaped portion 122a of the metal stem 120 is inserted into a depressed portion formed at one end portion of the pressure transmission part 17 and is joined to it in this state by brazing or the like.

On the other hand, a bar-shaped portion 15a extending to the pressure transmission part 17 from the inner surface of the pressure receiving diaphragm 15 is provided on the inner surface. This bar-shaped portion 15a of the diaphragm 15 is a portion, which is not deformed by the pressure P, of the diaphragm 15. In the diaphragm 15, a thin portion 15b around this bar-shaped portion 15a is a portion to be deformed by the pressure P.

This bar-shaped portion 15a is a portion fixed to the pressure transmission part 17 in the pressure receiving diaphragm 15. The bar-shaped portion 15a is inserted into a depressed portion formed at the other end portion of the pressure transmission part 17 and is joined to it in this state by brazing or the like.

As shown in FIG. 9, the bar-shaped portion 15a of the pressure receiving diaphragm 15 is formed in a shape extending from the other end portion of the pressure transmission part 17 to the pressure receiving diaphragm 15.

In this manner, the one end portion of the pressure transmission part 17 is integrated with and fixed to the straining portion 122 of the metal stem 120, and the other end portion of the pressure transmission part 17 is integrated with and fixed to the pressure receiving diaphragm 15.

As shown in FIG. 9, a thin hole 124 through which a space on an outer surface located in the housing 10 of the metal stem 120 communicates with the hollow portion of the metal stem 120 is formed in the metal stem 120.

The brazing of the above-described pressure transmission part 17 to the pressure receiving diaphragm 15 and the metal stem 120 is performed in a state where a brazing material is placed on the portions at which these three parts are to be joined and where three parts are combined with each other. At this time, the above-described thin hole 124 functions as a hole for discharging the binder or solvent of the brazing material from the hollow portion of the closed metal stem 120.

The pressure transmission part 17, the pressure receiving diaphragm 15, and the metal stem 120 are integrated into one piece. Accordingly, it is preferable to measure hermeticity in the hollow portion of the metal stem 120 and the measurement of the hermeticity can be carried out through the thin hole 124.

Here, the pressure transmission part 17 is a part shaped like a bar. However, the shape of the pressure transmission part 17 is not limited to this shape, but it may be formed in the shape of a sphere, a semi-sphere, or a drum. The detection pressure P is applied from the pressure receiving diaphragm 15 to the straining portion 122 of the metal stem 120 and the detection element 30, via the pressure transmission part 17.

Moreover, as the detection element 30 having a strain gauge function, although not limited, for example, an element in which a bridge circuit constructed of a diffusion resistance element or the like is formed on a silicon semiconductor chip by a semiconductor process can be employed.

A semiconductor chip having a strain gauge function like this has a function in which when the straining portion 122 as the pressure sensing part of the metal stem 120 is deformed by the pressure, the semiconductor chip itself is also strained according to this deformation and converts a change in resistance caused by the strain to an electric signal and outputs the electric signal.

The straining portion 122 of the metal stem 120 and the detection element 30 are constructed as a portion that receives load applied by the detection pressure P and is thereby strained. These straining portion 122 and detection element 30 have an effect on the fundamental performance of the pressure detection device 100.

The metal material constructing the metal stem 120 is required to have high strength and a low coefficient of thermal expansion because the metal stem 120 has the detection element 30, which is made of Si semiconductor or the like, bonded thereto by glass having a low melting point or the like.

Specifically, as the metal material of the metal stem 120 can be selected a material having main components of Fe, Ni, and Co, or Fe, Ni and having precipitation hardening components of Ti, Ni, and Al, or Ti, Nb added thereto, for example, precipitation hardening stainless steel. This metal stem 120 can be formed by pressing, cutting, cold forging, or the like.

Moreover, as shown in FIG. 8, a circuit board 40 made of a ceramic board or the like is provided in the main portion 11 of the housing 10. This circuit board 40 is provided in such a way as to cover the opening of the pipe portion 12 in a boundary between the main portion 11 and the pipe portion 12 and the peripheral portion of the circuit board 40 is fixed to the housing 10 by bonding or the like.

One example of the manufacturing method of the pressure detection device 100 will be described.

First, the metal stem 120, the pressure receiving diaphragm 15, and the pressure transmission part 17 are assembled with each other and a brazing material is placed on portions where these parts are to be joined to each other. Then, the metal stem 120 is welded to the pressure receiving diaphragm 15. Thereafter, the respective parts are brazed to each other by heating.

The pressure receiving diaphragm 15, the pressure transmission part 17, and the metal stem 20 are integrated into one unit and then the detection element 30 is attached to the outer surface of the straining portion 122 of the metal stem 120. Specifically, the detection element 30 is mounted on the outer surface of the straining portion 122 with glass (not shown) having a low melting point placed on the outer surface. Then, by heating and baking the glass, the detection element 30 is joined to the metal stem 120.

Next, in the unit to which the metal stem 120, the detection element 30 and the pressure receiving diaphragm 15 are integrated, one end portion 51 of the flexible printed board 50 is connected to the detection element 30 via solder or the like.

The other end portion 52 of the flexible printed board 50 is inserted into the main portion 11 of the housing 10 from the pipe portion 12 of the housing 10 and is pulled into the inside of the main portion 11 of the housing 10.

Next, the other end portion 52 of the flexible printed board 50 is made to pass through the through hole 46 of the circuit board 40, on which the IC chip 42 is mounted by wire bonding, and is connected to the circuit board 40 via solder or the like.

Next, the circuit board 40 is bonded and fixed to the main portion 11 of the housing 10. Then, a connector case 60 is assembled with the main portion 11 of the housing 10 and the edge portion 14 of the housing 10 is caulked to fix the connector case 60 to the housing 10.

When this connector case 60 is connected to the housing 10, the terminal 61 spring-contacts the circuit board 40 via a spring part 62, thereby being electrically connected to the circuit board 40. In this manner, the pressure detection device 130 shown in FIG. 8 is formed.

The pressure detection device 130 is mounted in the threaded hole (mounting hole) formed on the above-described engine head as a body to be detected via the threaded portion 13 of the housing 10, thereby being connected and fixed to the engine head.

When the pressure (cylinder pressure) P in the combustion chamber is applied from the pressure receiving diaphragm 15 to the straining portion 122 of the metal stem 120 via the pressure transmission part 17, as shown by arrows in FIG. 8 and FIG. 9, the straining portion 122 of the metal stem 120 is deformed by the pressure and this deformation is converted to an electric signal by the detection element 30 to thereby detect the pressure P.

The electric signal from the detection element 30 is transmitted to the circuit board 40 via the flexible printed board 50 and is processed by the IC chip 42 and a processed signal is outputted to the outside from the terminal 61.

According to the present embodiment, the pressure detection device 130 that includes: the hollow cylindrical metal stem 120 having the straining part 122, which is the pressure sensing part provided as a closing part, at one end thereof and having the opening portion 121 at the other end thereof; the pressure receiving diaphragm 15 bonded to the metal stem 120 in such a way as to close the opening portion 121 of the metal stem 120; and the pressure transmission part 17, which is provided in the hollow portion of the metal stem 120 in a state where its one end portion is located on the straining portion 122 side and where its other end portion is located on the pressure receiving diaphragm 15 side. The pressure transmission part 17 transmits pressure applied to the pressure receiving diaphragm 15 to the straining portion 122. In the pressure detection device 130, the straining portion 122 of the metal stem 120 is integrated with and fixed to the one end portion of the pressure transmission part 17, and the pressure receiving diaphragm 15 is integrated with and fixed to the other end portion of the pressure transmission part 17.

According to the present embodiment, three parts of the metal stem 120, the pressure transmission part 17, and the pressure receiving diaphragm 15 are integrated into one unit and fixed to each other. Therefore, it is possible to prevent a change in the state of contact between the parts and the creep of the part caused by the applied pre-load.

Therefore, according to the present embodiment, in the pressure detection device 130 in which the pressure received by the pressure receiving diaphragm 15 is transmitted to the straining portion 122 of the metal stem 120 via the pressure transmission part 17, it is possible to enhance pressure transmission performance between the three parts of the metal stem 120, the pressure transmission part 17, and the pressure receiving diaphragm 15.

In the pressure detection device 130 of the present embodiment, the fixing portion where the straining portion 122 of the metal stem 120 is fixed to one end portion of the pressure transmission part 17, and the fixing portion where the pressure receiving diaphragm 15 is fixed to the other end portion of the pressure transmission part 17, are constructed by joining the parts to each other.

Moreover, in the pressure detection device 130 of the present embodiment, the bar-shaped portion 15a fixed to the pressure transmission part 17 in the pressure receiving diaphragm 15, is a portion that is not deformed by the pressure and this bar-shaped portion 15a is formed in the shape extending from the pressure transmission part 17 to the pressure receiving diaphragm 15.

According to this, an effective area A (refer to FIG. 9) where the pressure receiving diaphragm 15 receives the pressure can be enlarged. When it is assumed that a force transmitted from the pressure receiving diaphragm 15 to the pressure transmission part 17 is F, $F = P \times A$.

In other words, by enlarging the above-described effective area A, the pressure receiving diaphragm 15 can transmit a large force F to the small pressure transmission part 17 by the pressure P received by the pressure receiving diaphragm 15.

Moreover, as shown in FIG. 9, a protruding part 12a is provided on the tip of the pipe portion 12 of the housing 10 and a depressed portion 123a is provided in the flange 123 of the metal stem 120, and the protruding part 12a is fitted into the depressed portion 123a.

Accordingly, when the pressure detection device 130 is joined to the above-described engine head by screwing, it is possible to prevent the metal stem 120 from being shifted in rotation around the axis of the metal stem 120 from the housing 10.

The metal stem 120 and the housing 10 can be joined to each other by welding or the like. However, when the pressure detection device 130 is screwed in the engine head, a shearing force caused by screwing is applied to the welding portion where the metal stem 120 is welded to the housing 10. Then, this welding portion is likely to be broken. However, as described above in the present embodiment, the stopper action of fitting the protruding part 12a in the depressed portion 123a can prevent the welding portion from being broken.

In the above-described fourth embodiment, the fixing portion where the straining portion 122 as the pressure sensing portion of the metal stem 120 is fixed to the pressure transmission part 17 and the fixing portion where the pressure receiving diaphragm 15 is fixed to the pressure transmission part 17 are constructed by joining the respective parts.

Here, in the above-described pressure detection device 130, any one of the fixing portion where the straining portion 122 of the metal stem 120 is fixed to the one end portion of the pressure transmission part 17 and the fixing portion where the pressure receiving diaphragm 15 is fixed to the other end portion of the pressure transmission part 17 may be constructed by integrally forming both parts to be fixed.

For example, the metal stem 120 and the pressure transmission part 17 can be integrally formed by MIM (metal injection molding), cutting, forging, or pressing, and the pressure transmission part 17 can be bonded to the pressure receiving diaphragm 15. Alternatively, the pressure transmission part 17 and the pressure receiving diaphragm 15 can be integrally formed by the above-described method, and the pressure transmission part 17 can be bonded to the metal stem 120.

Moreover, in the above-described fourth embodiment, the thin hole 124 for brazing or for measuring hermeticity is formed in the metal stem 120. This thin hole 124 is open to the inside of the housing 10 and hence is not required to be closed and does not make an effect on the sensor characteristics.

This thin hole 124 may be formed in a portion that connects the hollow portion of the metal stem 120 with the outside of the housing 10, but in this case, it is necessary to seal the thin hole 124 by an adhesive or the like after brazing is performed or after hermeticity is measured.

Other Embodiments

Although the present invention has been described in connection with some preferred embodiments thereof with reference to the accompanying drawings, it is to be noted that various changes and modifications will become apparent to those skilled in the art.

For example, in the above-described first, second, and third embodiments, the metal stem 20 and the metal case 16 are joined to each other by screwing, and the metal stem 20 and the attachment part 24 are joined to each other by screwing.

Figure 10A:
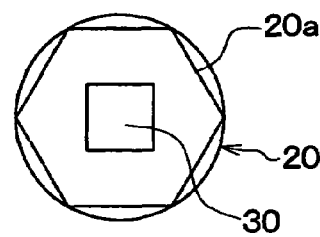
FIGS. 10A and 10B are a top view and a sectional view showing a metal stem according to a modification of the present invention.

In the case where the metal stem 20 has the threaded portion 23, as shown in FIG. 10A, a hexagonal portion 20a can be formed for screwing the metal stem 20.

Figure 10B:
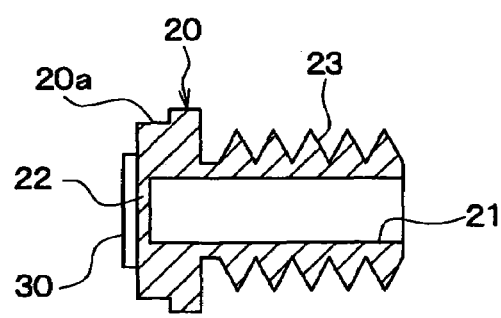

FIG. 10A and FIG. 10B show one example of the metal stem 20 having the hexagonal portion 20a. In the example shown in FIG. 10A and FIG. 10B, the hexagonal portion 20a is formed on the obverse surface of the diaphragm 22 on which the detection element 30 is mounted and the detection element 30 is bonded to the hexagonal portion 20a.

According to this, when the threaded portion 23 of the metal stem 20 is screwed in a mating part such as the metal case 16 or the attachment part 24, the threaded portion 23 can be easily screwed in by this hexagonal portion 20a.

Further, the hexagonal portion 20a can be used as a tool fitting portion on which a tool such as a spanner or a wrench for turning a screw can be fitted. The shape of the tool fitting portion like this is not limited to a hexagon but may be a polygon having two or more flat surfaces on its sides such as a triangle or a square in addition to the hexagon.

Moreover, when the metal stem 20 is joined to the mating part by screwing, friction occurs at a portion where the metal stem 20 is put into contact with the pressure transmission part 17 because the pre-load is applied thereto. To reduce this friction, the metal stem 20 can be joined to the mating part by screwing in a state where a lubricant is applied to the contact surface where the metal stem 20 is put into contact with the pressure transmission part 17.

Figure 11:
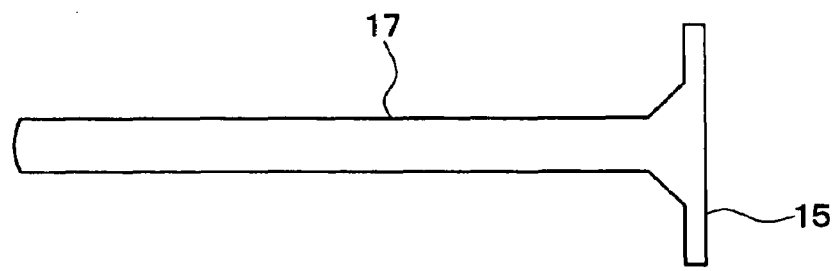
FIG. 11 is a schematic diagram showing a pressure receiving diaphragm and a pressure transmission part according to a modification of the present invention.

Furthermore, in the above-described first and second embodiments, the pressure receiving diaphragm 15 is separate from the pressure transmission part 17, but as shown in FIG. 11, it is also possible for the pressure receiving diaphragm 15 and the pressure transmission part 17 to be integrally formed.

As described above, in the pressure detection device of the above-described first and second embodiments the pressure receiving diaphragm 15 can be formed of a plate having no spring characteristic and having high rigidity, so the pressure receiving diaphragm 15 and the pressure transmission part 17 can be integrally formed.

Also in the third embodiment, when the spring part 70 is interposed between the pressure receiving diaphragm 15 and the pressure transmission part 17, construction shown in FIG. 11 in which the pressure receiving diaphragm 15 is integrated with the pressure transmission part 17 cannot be employed. However, when the spring part 70 is interposed between the pressure transmission part 17 and the detection element 30, the construction shown in FIG. 11 can be employed.

In the above-described embodiment, the pressure receiving diaphragm 15 is a part having no spring characteristic and having high rigidity, but the pressure receiving diaphragm 15 may be a part having spring characteristic. In this case, fluctuations in the spring characteristic of the pressure receiving diaphragm 15 occur but the fluctuations can be reduced by the spring characteristics of the spring portion 16b of the metal case 16 and the spring part 70 in the above-described embodiments.

In the above-described embodiments, the detection element 30 is separate from the circuit board 40 and hence these parts 30, 40 are connected to each other by the flexible printed board 50. However, it is not intended to limit the connection of these parts 30, 40 to this type.

For example, in FIG. 1, by forming the pressure transmission part 17 of a long part extending over the almost whole length of the pipe portion 12, the metal stem 20 is arranged in or near the main portion 11 of the housing 10. Accordingly, the detection element 30 and the circuit board 40 may be connected to each other by wire bonding or the like.

Alternatively, by modifying the shape of the housing 10, for example, by making the pipe portion 12 as short as possible or by eliminating the pipe portion 12, the distance between the detection element 30 and the circuit board 40 that is a connector side is made short. Accordingly, the detection element 30 and the circuit board 40 can be also connected to each other by wire bonding or the like.

In other words, the housing 10 is not limited to the shape including the cylindrical main portion 11 and the pipe portion 12, which have been described above. This shape of the housing 10 is suitable for a combustion pressure sensor and the other shape of the housing may be employed.

Moreover, an element having a function other than the above-described strain gauge function can be employed as the detection element 30. It is only essential that a detection element outputs an electric signal responsive to the detection pressure that the detection element receives from the pressure transmission part 17.

Further, in the example shown in FIG. 1, the IC chip 42, the circuit board 40, and various kinds of electric connection parts are arranged in the portion between the detection element 30 and the connector portion 60 in the housing 10. However, the construction of the portion is not limited to this but can be modified as appropriate.

Still further, it is to be understood that the use of the pressure detection device of the present invention is not limited to the combustion pressure sensor described above.

While the invention has been described with reference to preferred embodiments thereof, it is to be understood that the invention is not limited to the preferred embodiments and constructions. The invention is intended to cover various modification and equivalent arrangements. In addition, while the various elements of the preferred embodiments are shown in various combinations and configurations, which are preferred, other combinations and configuration, including more, less or only a single element, are also within the spirit and scope of the invention.

What is claimed is:

1. A pressure detection device comprising:
    a stem having a cylindrical hollow portion therein, wherein the stem has a closed end portion used as a pressure sensing section, and an open end portion communicating with the hollow portion;
    a pressure receiving diaphragm that receives a pressure from a subject device, and is jointed to the stem to close the open end portion of the stem; and
    a pressure transmission member, which is located in the hollow portion to transmit the pressure received by the pressure receiving diaphragm to the pressure sensing section,
    wherein the pressure sensing section of the stem is fixed to a first end portion of the pressure transmission member, and the pressure receiving diaphragm is fixed to a second end portion of the pressure transmission member.

2. The pressure detection device according to claim 1, wherein:
    the pressure sensing section of the stem has a first engagement portion engaged with the first end portion of the pressure transmission member; and
    the pressure receiving diaphragm has a second engagement portion engaged with the second end portion of the pressure transmission member.

3. The pressure detection device according to claim 1, wherein the pressure sensing section of the stem and the first end portion of the pressure transmission member are constructed of a single member.

4. The pressure detection device according to claim 1, wherein the pressure receiving diaphragm and the second end portion of the pressure transmission member are constructed of a single member.

5. The pressure detection device according to claim 1, wherein:
    the pressure receiving diaphragm has a diaphragm portion deformed in accordance with the pressure, and a fixing portion extending from the diaphragm portion to the second end portion of the pressure transmission member;
    the fixing portion of the pressure receiving diaphragm is fixed to the second end portion of the pressure transmission member; and
    the fixing portion is an enlarged part enlarged from a side of the second end portion of the pressure transmission member to the diaphragm portion.

6. The pressure detection device according to claim 1, wherein the subject device is a fuel combustion chamber of an engine.

7. The pressure detection device according to claim 1, wherein:
    the stem has an inner wall surface for defining the cylindrical hollow portion extending in an axial direction; and
    the pressure transmission member located in the hollow portion is spaced from the inner wall surface of the stem in a radial direction.

8. The pressure detection device according to claim 7, wherein the pressure transmission member has a bar shape extending in the axial direction.

9. The pressure detection device according to claim 8, wherein
    the first end portion and the second end portion of the pressure transmission member are positioned at two end sides in the axial direction;
    the pressure sensing section of the stem has a first engagement portion engaged with the first end portion of the pressure transmission member; and
    the pressure receiving diaphragm has a second engagement portion engaged with the second end portion of the pressure transmission member.

10. The pressure detection device according to claim 1, wherein the pressure transmission member is a part formed in one of a spherical, semi-spherical and drum shape.

11. A pressure detection device comprising:
a stem that defines a cylindrical hollow portion therein;
a pressure sensing section that includes a flexible straining portion and a detection element at a first end of the stem, the straining portion having a flexible thin portion, the detection element being attached to an outer surface of the pressure sensing section, thereby outputting an electric signal responsive to an applied pressure;
a pressure receiving diaphragm that has a diaphragm portion deformed in accordance with the pressure sensed at a second end of the stem;
a pressure transmission member located between the pressure sensing section and the pressure receiving diaphragm in the hollow portion of the stem to transmit the sensed pressure to the pressure sensing section;
a non-deformable engagement portion that extends from the diaphragm portion toward the pressure sensing section in the hollow portion and being fixed to the pressure transmission member, wherein
the pressure sensing section is fixed to the pressure transmission member.

12. The pressure detection device according to claim 11, wherein
the engagement portion is positioned substantially along an axis of the hollow portion.

13. The pressure detection device according to claim 11, further comprising another non-deformable engagement portion that extends from the pressure sensing section toward the pressure receiving diaphragm in the hollow portion, and that is fixed to the pressure transmission member.

* * * * *